April 23, 1957 R. LAPSLEY 2,789,448
TRANSMISSION
Filed April 19, 1952 4 Sheets-Sheet 2
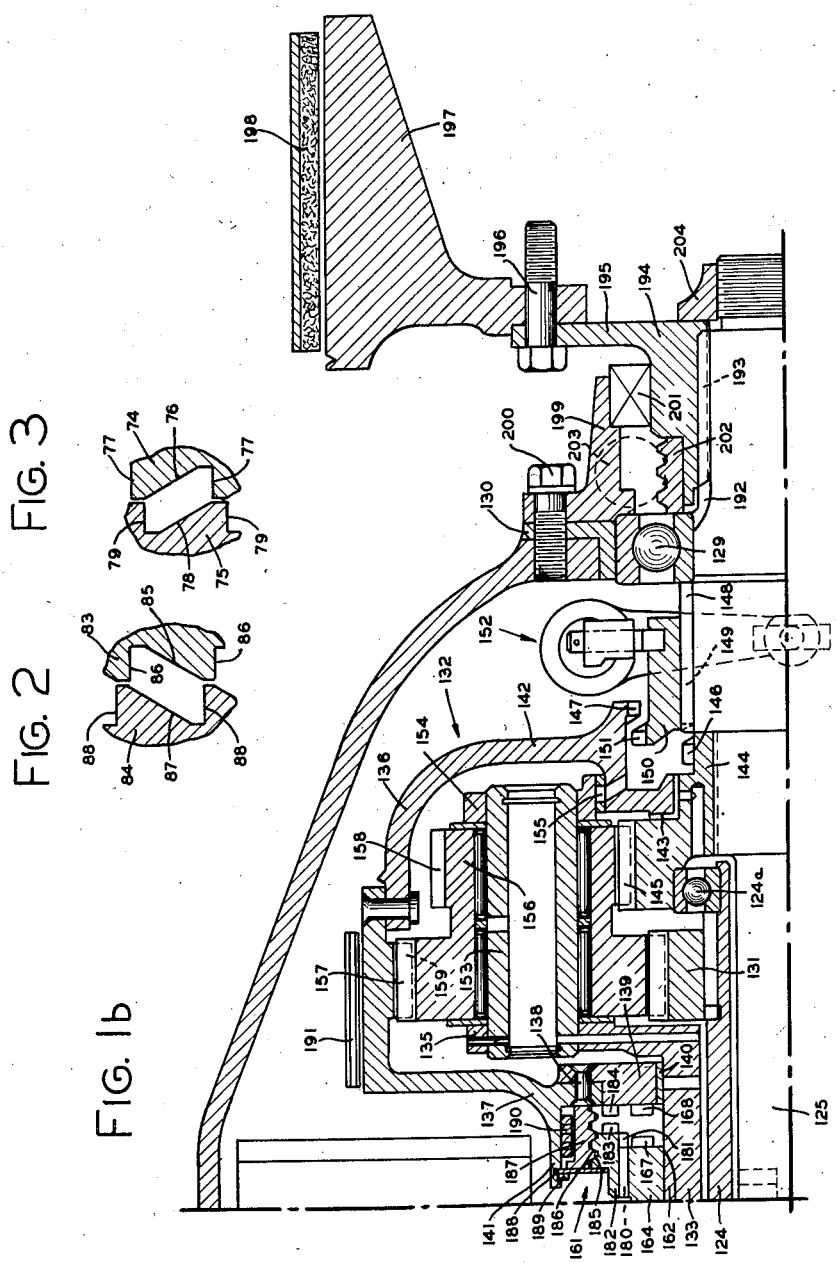
INVENTOR.
ROBERT LAPSLEY
BY
ATTYS.

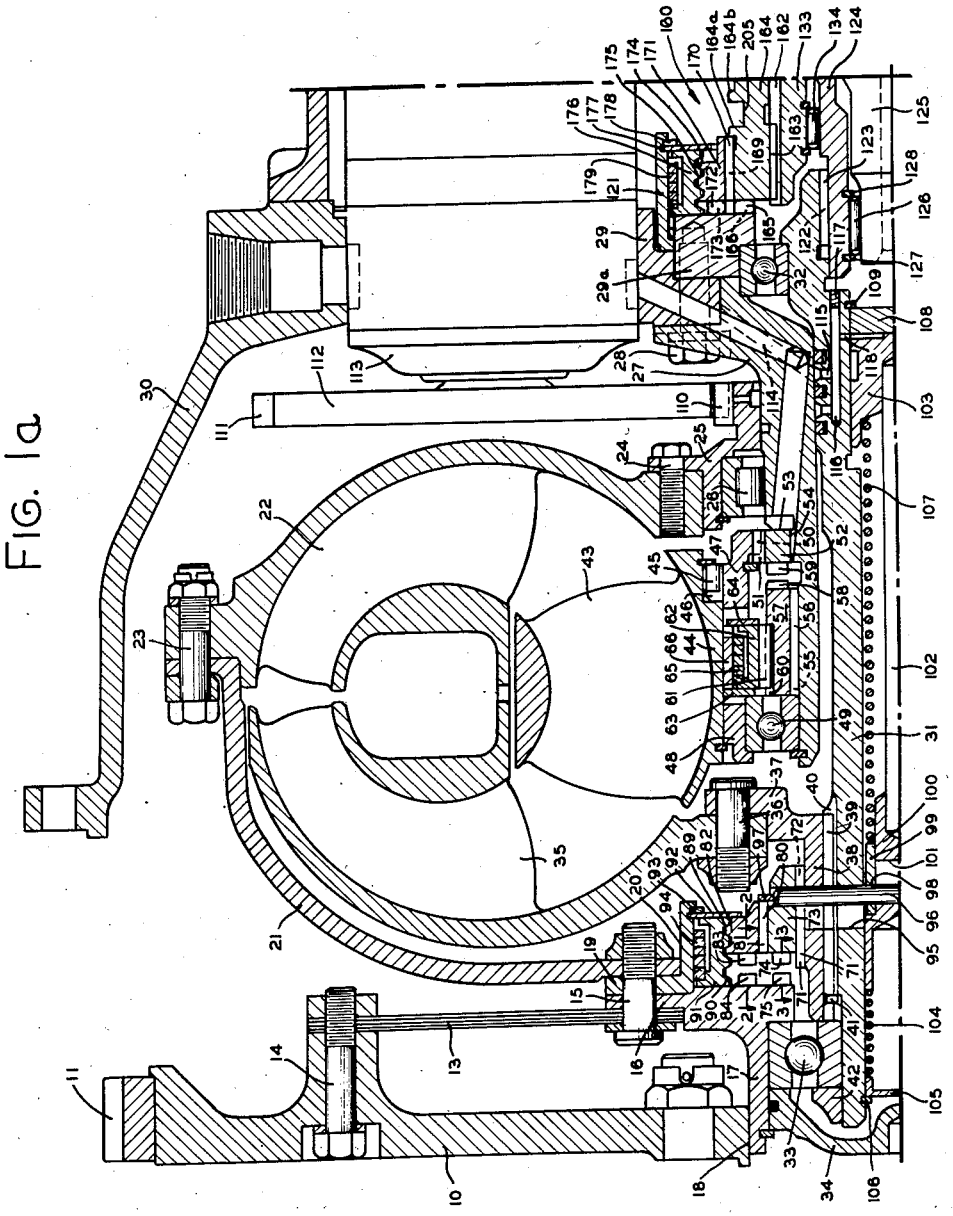

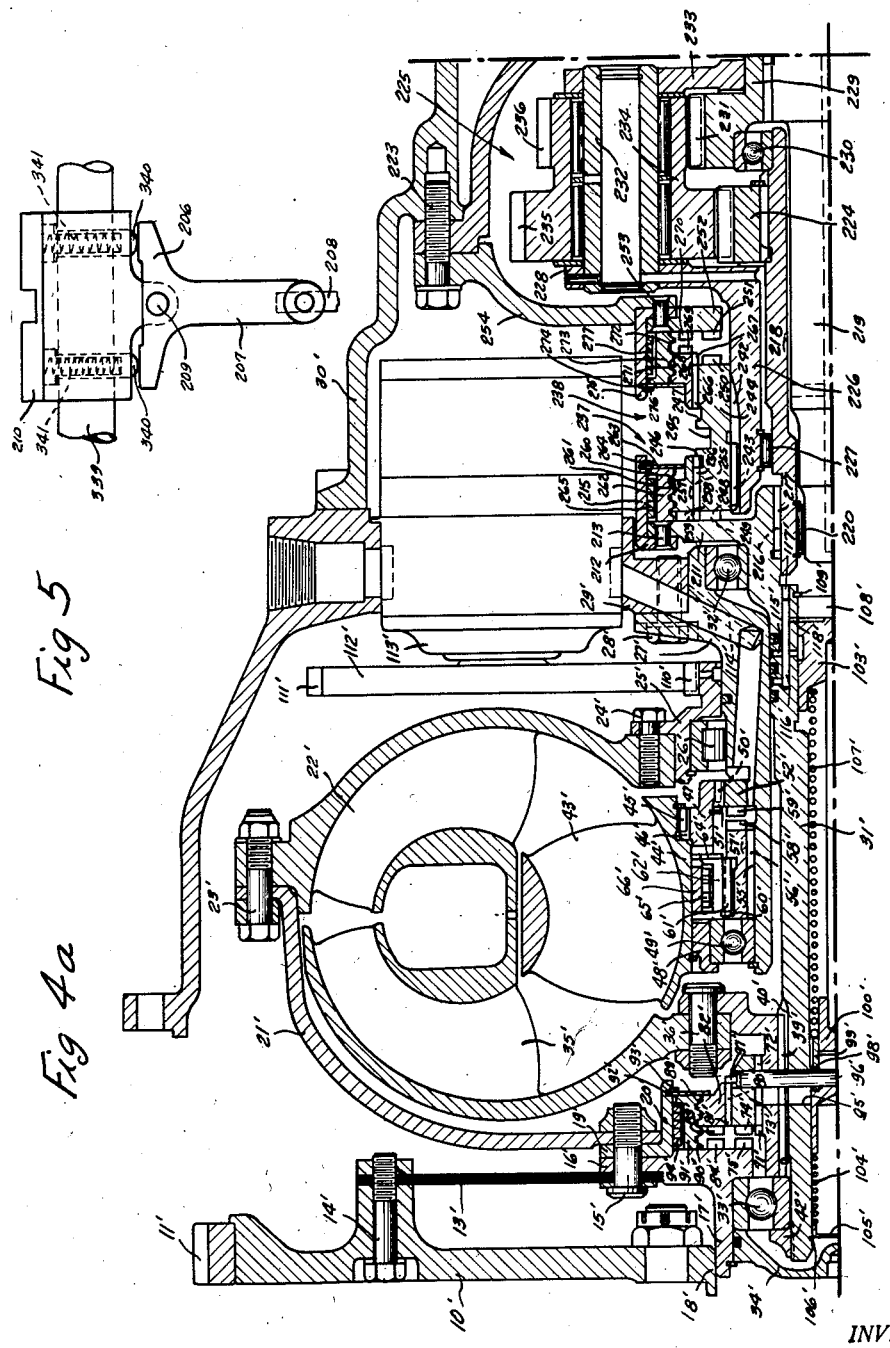

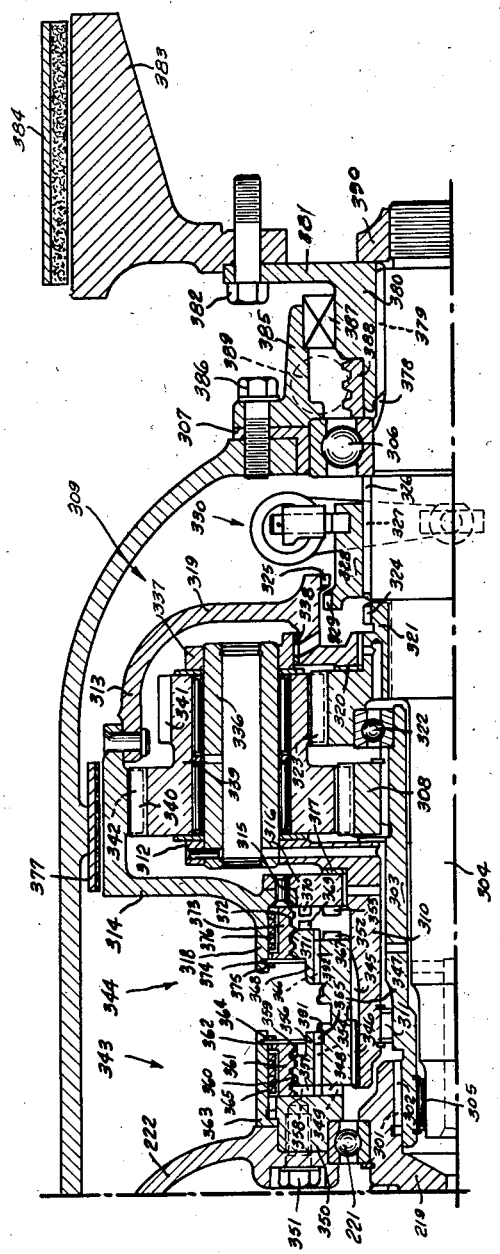

United States Patent Office 2,789,448
Patented Apr. 23, 1957

2,789,448

TRANSMISSION

Robert Lapsley, Buchanan, Mich., assignor to Clark Equipment Company, Buchanan, Mich., a corporation of Michigan Application April 19, 1952, Serial No. 283,176

25 Claims. (Cl. 74—732)

My present invention relates generally to an improved transmission for commercial vehicles, such as trucks and buses.

More specifically, my invention is concerned with a transmission of the type embodying a fluid torque converter unit and planetary gear means to provide a plurality of drive ratios.

It is an object of my present invention to provide a transmission of the character indicated wherein any one of a plurality of forward drive ratios or reverse drive may be effected between the driven and driven shafts of the transmission without clash of relatively movable parts in the transmission in effecting selected drive ratios.

It is a further object of my present invention to provide a transmission of the character noted wherein changes between the forward drive ratios may be effected while the vehicle is in motion without causing shock to the latter.

It is well known in the art to provide a transmission with shiftable clutch collar members in association with planetary gear means for selecting a desired drive ratio. In order to reduce clash and shock, when the clutch collar members are shifted to select a desired drive ratio, various forms of friction disc or "blocker type" synchronizers have been associated with the clutch collar members. The synchronizers, theoretically, at least, are supposed to prevent engagement of the designated clutch collar member with the clutch teeth of the associated rotating member, as, for example, a gear, until synchronous speed is reached between the clutch collar member and gear. Practically, as those skilled in the art well know, known forms of synchronizers do not live up to expectations in that clash and shock between the clutch collar member and the clutch teeth of the gear are not entirely eliminated.

In my present invention I provide a transmission including a fluid torque converter and at least one planetary gear assembly together with novel forms of clutch and brake mechanisms which are utilized in selecting the various drive ratios of the transmission. Engagement of the clutch or brake mechanisms does not take place when ordered unless the members to be locked together are rotating at substantially synchronous speed.

It is an object of my present invention to provide a brake mechanism for selectively positively braking the planet carrier of the planetary gear assembly to the transmission housing at practically the instant of zero relative rotation between the planet carrier and transmission housing, through the use of two sets of cooperating uni-directional brake teeth, the first set being arranged to be automatically projected into an engaged position so as to prevent counter rotation of the planet carrier relative to the housing, during which movement the second set, when selected and/or ordered, may be projected into an engaged position for preventing the other direction of rotation of the planet carrier relative to the housing an instant before the first set of brake teeth reach actual braking engagement.

It is another object of the present invention to provide in the preferred form of my transmission a clutch mechanism for selectively positively clutching the planet carrier and the planet cage of the planetary gear assembly together for conjoint rotation at practically the instant of synchronous relative rotation between the planet carrier and planet cage, through the use of two sets of cooperating uni-directional clutch teeth, the first set being arranged to be automatically projected into driving relation so as to prevent counter relative rotation between the members during which movement the second set, when selected and/or ordered, may be projected into driving relation for the other direction of relative rotation between the members, an instant before the first set of clutch teeth reach actual driving engagement.

It is a still further object of my present invention to arrange the second sets of brake and clutch teeth at the opposite ends of a common axially shiftable hub member.

It is an additional object of my present invention to provide means for preventing the second sets of brake and clutch teeth from being engaged, even though ordered to, unless the respective first sets of brake and clutch teeth are engaged or are being engaged.

The transmission of my present invention is further provided with an axially shiftable clutch collar member which, in one position is adapted to provide a neutral drive for the transmission, in another position is adapted to clutch a gear driven by the planet pinions of the planetary gear assembly to the driven shaft for providing forward drive, and in still another position is adapted to clutch the planet cage of the planetary gear assembly to the driven shaft for providing reverse drive. Suitable brake means is provided for selectively braking the planet cage when the clutch collar member is shifted between the described positions. In the form of my invention a transmission is provided in which two forward drive ratios and a single reverse drive ratio may be effected.

A further object of my present invention resides in the provision of a clutch mechanism of the character indicated, for selectively positively clutching the pump and turbine elements of the fluid torque converter unit together at substantially synchronous speed.

In another form of my present invention herein specifically disclosed, I provide, in addition to the elements of the form of transmission above first referred to, a second planetary gear assembly comprising a sun gear, a planet carrier and planet pinion means. The second planetary gear assembly is interposed in the transmission between the fluid torque converter and the planetary gear assembly described above. A brake mechanism of the character described above is provided for selectively positively braking the planet carrier of the second planetary gear assembly to the transmission housing and a clutch mechanism of the character noted is provided for selectively positively clutching the planet carrier of the second planetary gear assembly and the turbine or drive shaft together for conjoint rotation at substantially synchronous speed. The latter form of transmission of my present invention provides for four forward drive ratios and two reverse drive ratios.

Now, in order to acquaint those skilled in the art with the manner of constructing and utilizing transmissions constructed in accordance with the principles of my present invention, I shall describe in connection with the accompanying drawings certain preferred forms of my invention.

In the drawings:

Figures 1a and 1b when laid end on end and aligned along the dash-dot lines, illustrate a first form or embodiment of a transmission embodying my present invention;

Figure 2 is a sectional view of the clutch teeth taken along the line 2—2 in Figure 1a, looking in the direction indicated by the arrows;

Figure 3 is a sectional view of the clutch teeth taken along the line 3—3 in Figure 1a, looking in the direction indicated by the arrows;

Figures 4a and 4b when laid end on end and aligned along the dash-dot line show another embodiment of the transmission constructed in accordance with the principles of my present invention; and Figure 5 is an enlarged elevational view of the shift means provided for shifting the various shift hubs of the transmission of my present invention.

Referring now to Figures 1a and 1b, there is shown an engine flywheel 10 to which, at the outer periphery thereof, is secured an external starter ring gear 11. The engine flywheel 10 is formed with a plurality of circumferentially spaced axially rearwardly projecting bosses to which a plurality of flexible discs 13 are secured at their outer peripheries by suitable bolts 14. The discs 13 at their inner peripheries are suitably secured by circumferentially spaced bolts 15 to the radial flange portion 16 of a tubular hub member 17, suitably piloted in a central opening 18 formed in the engine flywheel 10. The flexible discs 13 are provided for absorbing end thrust of the hub 17 for preventing such end thrust from being transmitted to the engine flywheel 10.

The radial flange 19 of an annular clutch drum 20 is received in a circumferential recess formed in the radial flange 16 of hub member 17. A torque converter housing 21 is secured at the inner periphery thereof, together with the radial flange 19 of the clutch drum 20, to the radial flange 16 of hub member 17, by means of the aforementioned bolts 15. Secured to the converter housing 21 at the outer periphery thereof by circumferentially spaced bolts 23 is a pump element 22. The pump element 22, at its inner periphery, is secured by a plurality of circumferentially spaced bolts 24 to a hub member 25 which is journaled on a roller bearing assembly 26. The roller bearing assembly 26 is in turn journaled on a stationary sleeve member 27 which is secured by bolts 28 to an inwardly extending wall 29 of a transmission housing 30.

A tubular shaft 31 extends through the stationary sleeve member 27 and is journaled adjacent its rear end in a ball bearing assembly 32 suitably mounted in the rear end of the stationary sleeve member 27. The shaft 31 at its forward end is journaled within a ball bearing assembly 33 secured in the hub member 17. The forward end of shaft 31 is preferably enclosed by a suitable plate member 34 seated in the end of the hub member 17 substantially co-planar with the engine flywheel 10.

Mounted for rotation within the converter housing 21 is a turbine element 35 which is secured at its inner periphery by a plurality of circumferentially spaced bolts 36 to the radial flange portion 37 of a hub member 38. The hub member 38 at the inner periphery thereof is formed with internal straight splines 39 which cooperate with external straight splines 40 formed on the shaft 31. The hub member 38 is located axially by means of a retainer ring 41 which is held in position against a shoulder formed in the shaft 31 by means of the aforementioned ball bearing assembly 33 which bears against the end of the hub member 38. A nut 42 threaded onto the end of the shaft 31 holds the ball bearing assembly 33 in proper position.

Mounted within the converter housing 21 intermediate of the pump element 22 and the turbine element 35 is a stator or reaction member 43 having a hub portion 44 including internal straight splines 45 formed at one end thereof which cooperate with the external straight splines 46 of a bushing member 47. The hub portion 44 at its other end is fixed to an annular ring member 48 which is journaled on a ball bearing assembly 49 mounted on the forward end of the aforedescribed stationary sleeve member 27. The bushing member 47 at one end thereof is formed with internal straight splines 50 which mate with the external straight splines 51 of an annular brake element 52 which is held against axial movement by the radial shoulder 53 formed in the stationary sleeve member 27. The brake element 52 rotates conjointly with the reaction member 43 and at its inner periphery is suitably seated on a bearing portion 54 of the stationary sleeve member 27.

The stationary sleeve member 27 is formed with external helical splines 55 intermediate of the ball bearing assembly 49 and the brake element 52. Cooperating with the external helical splines 55 are the internal helical splines 56 of an annular brake element 57. The brake element 57 is formed with radially extending circumferentially spaced jaw clutch or ratchet teeth 58 which are adapted to cooperate with radially extending circumferentially spaced jaw clutch or ratchet teeth 59 formed integrally with the brake element 52. The brake element 57 is formed with external straight splines 60 which cooperate with the internal straight splines 61 formed in an annular spring carrier member 62 held against axial movement by thrust washers 63 and 64. Mounted on the outer periphery of the spring carrier 62 is a coil spring friction clutch 65 which at one end is fixed in the spring carrier 62 and at its other end is free. The outer periphery of the coil spring friction clutch 65 normally lightly frictionally engages the annular flange portion 66 of the aforedescribed bushing member 47.

Upon initial rotation of the pump and turbine elements 32 and 35 in one direction, the reaction member 43 tends to rotate in the opposite direction. Simultaneously, the coil spring 65 is caused to expand whereupon its frictional engagement with the annular flange 66 increases. This frictional engagement causes the brake element 57 to be threaded axially to the right as viewed in Figure 1a, thereby disposing the jaw clutch teeth 58 into engagement with the jaw clutch teeth 59 of brake element 52 positively braking the reaction member 43 to the stationary sleeve member 27. When the clutch teeth 58 and 59 are in engagement and the reaction member 43 is stationary, the torque converter unit functions as a torque multiplier. As the pump and turbine elements 22 and 35 reach synchronous speed, oil impinges on the rear face of the reaction member 43 causing the latter to tend to rotate in the same direction as the pump and turbine elements. When this occurs the brake element 57 is caused to be threaded axially to the left to the position shown in Figure 1a by virtue of the light frictional engagement of the spring 65 with the annular flange 66. The clutch teeth 58 and 59 are disengaged and the reaction member 43 is free to rotate in the same direction as the pump and turbine elements 22 and 35. In this condition of operation, the torque converter unit functions as a fluid coupling. It will thus be readily observed that engagement or disengagement of the clutch teeth 58 and 59 is dependent upon the direction of rotation of the reaction member 43. The aforedescribed brake construction forms the subject matter of my copending application Serial No. 42,258, filed August 3, 1948.

The aforedescribed hub member 38 splined on the shaft 31 is formed with external straight splines 71 which cooperate with the internal straight splines 72 of an annular clutch ring or element 73. The clutch element 73 serves as a torque transmitting element. The clutch element 73 at one end is formed with radially extending circumferentially spaced jaw clutch teeth or ratchet teeth 74 which are adapted to be selectively disposed in engagement with radially extending circumferentially spaced jaw clutch teeth or ratchet teeth 75 formed on the hub member 17. As shown in Figure 3, the clutch teeth 74 are formed with ramps 76 and driving faces 77 and the clutch teeth 75 are formed with ramps 78 and driving faces 79.

The clutch element 73 is formed with external straight splines 80 which cooperate with the internal straight splines 81 of an annular clutch ring or element 82. The clutch element 82 serves as a torque transmitting element. The clutch element 82 at one end is formed with a plurality of radially extending circumferentially spaced jaw clutch or ratchet teeth 83 which are adapted to be disposed selectively in engagement with a plurality of radially extending circumferentially spaced jaw clutch or ratchet teeth 84 formed on the hub member 17. As shown in Figure 2, the clutch teeth 83 are formed with ramps 85 and driving faces 86, and the clutch teeth 84 are formed with ramps 87 and driving faces 88. The planes of the faces of the ramps 85 and 87 extend diagonally of the planes of the faces of the ramps 76 and 78.

The clutch element 82 is formed with external left hand helical threads or splines 89 which cooperate with internal left hand helical threads or splines 90 formed in an annular spring carrier member 91 fixed against axial movement between the radial flange 16 of hub member 17 and a thrust washer 92 positioned in the aforedescribed clutch drum 20 by a retainer ring 93. The spring carrier 91 at its outer periphery carries a coil spring friction clutch 94. The spring 94 is fixed at one end in the spring carrier 91 and is free at its other end. The spring 94 at its outer periphery is adapted to normally lightly frictionally engage the inner periphery of the clutch drum 20.

A radially extending slot 95 is formed in the shaft 31 and the hub member 38. A radially extending pin member 96 is disposed within the slot 95 and at its outer end extends into an opening formed in the clutch element 73. The pin member 96 is retained in place by a spring ring 97 which is adapted to abut the end of the clutch element 82 opposite clutch teeth 83 thereof. The pin member 96 at its inner end extends through an opening 98 formed in a sleeve member 99 which is disposed within the tubular shaft 31 and is mounted for axial sliding movement on a member 100. The member 100 has a radial slot 101 formed therein which receives the inner end of the pin member 96. The member 100 is suitably secured to the forward end of an axially extending rod 102 which at its rear end has secured thereon a piston 103 slidably mounted within the tubular shaft 31.

A coil spring 104 is disposed within the shaft 31 between the member 100 and a washer 105 held against axial movement in one direction by means of a retaining ring 106 secured in the shaft 31. A second coil spring 107 is disposed within the shaft 31 between the piston 103 and the sleeve member 99.

A closure member or plate 108 is disposed within the shaft 31 adjacent the piston 103 and the closure member 108 is retained against axial movement in one direction by means of a retaining ring 109.

The aforedescribed hub member 25 supporting the pump element 22 is formed with external gear teeth 110 which mesh with the external gear teeth 111 of a gear member 112 mounted on the drive shaft of a fluid pump 113. When the pump element 22 is rotating the fluid pump 113 is driven and thus fluid under pressure is developed thereby. A fluid passageway 114 is formed in the stationary sleeve member 27 and at one end is adapted to be placed in communication with the output side of the fluid pump 113. The passageway 114 at its other end communicates with an annular fluid passageway 115 which in turn connects with an axially extending fluid passageway 116 which is closed at one end by a plug member 177. The passageway 116 intermediate its ends communicates with a radial fluid passageway 118 which connects with the interior of the tubular shaft 31 intermediate of the piston 103 and the closure plate 108. When fluid under pressure, developed by the pump 113, is selectively delivered through the fluid passageways 114, 115, 116 and 118 to the interior of shaft 31, it will be readily apparent that the piston 103 is urged to the left from the position shown in Figure 1a. The aforedescribed clutch construction forms the subject matter of my copending application Serial No. 225,643, filed May 10, 1951.

The rear end of the shaft 31 is formed with internal straight splines 122 which mate with the external straight splines 123 of a rearwardly extending tubular sleeve member 124. The sleeve member 124 rotates conjointly with the shaft 31.

The forward end of an output shaft 125 is journaled in a plurality of needle bearings 126 which are held within the sleeve member 124 against axial movement by retaining rings 127 and 128. The shaft 125 adjacent its rear end is journaled within a ball bearing assembly 129 mounted in the rear end wall 130 of the transmission housing 30. Secured to the sleeve member 124 adjacent the rear end thereof is a sun gear 131 which forms part of a planetary gear assembly indicated generally by the reference numeral 132. A sleeve member 133 is disposed concentrically about the sleeve member 124 and the sleeve member 133 at the forward end thereof, is journaled on a plurality of needle bearings 134 which are arranged about the outer periphery of the sleeve member 124. The sleeve member 133, adjacent its rear end is formed with a radially extending flange portion 135 which serves as a planet carrier for the planetary gear assembly 132.

Disposed concentrically about the radial flange 135 of sleeve 133 and the sun gear 131 is a two-peice planetary ring gear carrier 136, which at its forward end has a radially inwardly extending flange portion 137 secured by rivets 138 to a ring member 139 journaled on an annular bushing member 140 mounted on the sleeve member 133 adjacent the radial flange 135. Formed integrally with the inwardly extending radial flange 137 is an axially forwardly extending clutch drum portion 141 provided for a purpose to be described hereinafter. The planetary cage 136 at its rear end is formed with a radially inwardly extending flange portion 142 journaled at its inner periphery on an annular bushing member 143 mounted on a stepped hub member 144 which is suitably journaled on the output shaft 125. The stepped hub member 144 is also journaled on a ball bearing assembly 124a mounted on the sleeve member 124 adjacent the rear end theerof. The stepped hub member 144 is formed with external gear teeth 145 and external jaw clutch teeth 146. The inwardly directed radial flange 142 of the planet ring gear carrier 136 is formed with internal jaw clutch teeth 147.

The output shaft 125 adjacent the ball bearing assembly 129 is formed with external straight splines 148 on which are mounted the internal straight splines 149 of an annular clutch collar member 150. The clutch collar member 150 is formed with external jaw clutch teeth 151 which are adapted to be selectively disposed in engagement with the jaw clutch teeth 147. Axial movement of the clutch collar member 150 is adapted to be effected through suitable manually or automatically actuated shift means indicated generally at 152. With the member 150 in the position shown in Figure 1b the transmission is in neutral. When the clutch collar member 150 is shifted to the left from the position shown in Figure 1b, the splines 149 of member 150 are disposed in meshing engagement with the external jaw clutch teeth 146 of the stepped hub member 144 for effecting a forward drive to the output shaft 125 as will be described in detail hereinafter. When the clutch collar member 150 is shifted to the right from the position shown in Figure 1b, the external jaw clutch teeth 151 are disposed in meshing engagement with the internal jaw clutch teeth 147 of the planetary ring gear carrier 136 for effecting a reverse drive to the output shaft 125 as will also be described more fully hereinafter.

Arranged within the planetary ring gear carrier 136 are a plurality of axially extending circumferentially spaced pin members 153 which are mounted at their forward ends in the radially extending flange portion 135 of the sleeve member 133. The pin members 153 at their rear ends are fixed in an annular ring member 154 which at its inner periphery is journaled on an annular bushing member 155 mounted on a shoulder formed at the inner periphery of the radially inwardly extending flange portion 142 of the planetary ring gear carrier 136. Suitably journaled on the pin members 153 are compound planet pinions 156 which each comprise pinion portions 157 and 158. The pinion portions 157 have meshing engagement with the sun gear 131 fixed to the sleeve member 124 and also have meshing engagement with an internal gear portion 159 formed in the planetary ring gear carrier 136. The pinion portions 158 have meshing engagement with the gear portion 145 of the stepped hub member 144.

Mounted concentrically about sleeve member 133 intermediate of the transmission housing wall 29 and the planetary ring gear carrier 136 is a brake or torque transmitting mechanism indicated generally at 160 and a clutch or torque transmitting mechanism indicated generally at 161, the constructions of which I shall now describe in detail. The forward end of sleeve member 133 is formed with external straight splines 162 which receive the internal straight splines 163 of an annular hub member 164. The hub member 164 at its forward end is formed with radially extending circumferentially spaced brake or ratchet teeth 165 which are adapted to be disposed in meshing engagement with radially extending circumferentially spaced brake or ratchet teeth 166 formed integrally with an annular ring 29a suitably secured to the transmission wall 29 by the bolts 28. The hub member 164 at its rear end is formed with radially extending circumferentially spaced jaw clutch or ratchet teeth 167 which are adapted to be disposed in engagement with radially extending circumferentially spaced jaw clutch or ratchet teeth 168 formed integrally with the ring member 139 supporting the forward flange 137 of the planetary ring gear carrier 136.

The hub member 164 at its forward end is formed with external straight splines 169 which mesh with the internal straight splines 170 of a brake element 171. The brake element 171 at its forward end is formed with a plurality of radially extending circumferentially spaced brake or ratchet teeth 172 which are adapted to be disposed selectively in engagement with a plurality of radially extending circumferentially spaced brake or ratchet teeth 173 formed on the ring member 29a. The teeth 165, 166, 172 and 173 are of the same configuration and arranged in the same manner as the aforedescribed jaw clutch teeth 74, 75, 83 and 84 shown in detail in Figures 2 and 3.

The brake element 171 is formed with external helical threads or splines 174 which cooperate with internal helical threads or splines 175 formed in an annular spring carrier member 176 fixed against axial movement between the ring member 29a and a thrust washer 177 positioned in an annular axially rearwardly extending brake drum 121 by a retainer ring 178. The brake drum 121 is suitably secured to the transmission wall 29. The spring carrier 176 at its outer periphery carries a coil spring friction brake 179. The spring 179 is fixed at one end in the spring carrier 176 and is free at its other end. The spring 179 at its outer periphery is adapted to normally lightly frictionally engage the inner periphery of the brake drum 121.

The rear end of the hub member 164 is formed with external straight splines 180 which cooperate with the internal straight splines 181 of a clutch element 182. The clutch element 182 is formed with a plurality of radially extending circumferentially spaced jaw clutch or ratchet teeth 183 which are adapted to be disposed in engagement with a plurality of radially extending circumferentially spaced jaw clutch or ratchet teeth 184 formed on the ring member 139 supporting the forward flange 137 of the planet ring gear carrier 136.

The clutch element 182 is formed with external helical threads or splines 185 which cooperate with internal helical threads or splines 186 formed in an annular spring carrier member 187 fixed against axial movement between the forward radially inwardly extending flange 137 of the planet ring gear carrier 136 and a thrust washer 188 positioned in the clutch drum 141 by a retainer ring 189. The spring carrier 187 at its outer periphery carries a coil spring friction clutch 190. The spring 190 is fixed at one end in the spring carrier 187 and is free at its other end. The spring 190 at its outer periphery is adapted normally to lightly frictionally engage the inner periphery of the clutch drum 141. The clutch teeth 167, 168, 183 and 184 are of the same configuration as the clutch teeth 74, 75, 83 and 85 shown in detail in Figures 2 and 3 but are arranged in a reverse order.

A suitable brake band 191 is disposed about the planet ring gear carrier 136 and is provided for braking the latter when the clutch collar member 150 is to be shifted axially between forward, neutral and reverse. The brake band 191 is adapted to be disposed in braking engagement with the planet ring gear carrier 136 by means of brake actuating means, of the character for example, shown in my copending application Serial No. 225,642, filed May 10, 1951, now Patent No. 2,656,105.

The rear end of the output shaft 125 outwardly of the transmission housing 30 is formed with external straight splines 192 which cooperate with the internal straight splines 193 of a hub member 194. The hub member 194 is formed with a radially outwardly extending flange portion 195 to which, at its outer periphery, is secured, as by bolts 196, a brake drum 197. A suitable brake band 198 is disposed about the brake drum 197 and when applied is adapted to brake the output shaft 125. Any suitable actuating means (not shown) may be provided for applying the brake band 198 to the brake drum 197.

An annular flange member 199 is secured, by bolts 200, to the rear end wall of the transmission housing 30, and a suitable oil seal 201 is disposed between the inner periphery of the flange member 199 and the outer periphery of the hub member 194. Also secured to the hub member 194 is a worm gear 202 which has meshing engagement with a gear 203 provided for driving a speedometer. A suitable nut 204 is threaded on to the rear end of the output shaft 125 and is provided for maintaining the hub member 194 on the output shaft 125.

I shall now describe in detail the operation of the above described transmission of my present invention.

In the following description the directions of rotation are referred to as if viewed looking toward the engine flywheel 10 from the right hand side of Figures 1a and 1b.

The engine flywheel 10 normally rotates in an anti-clockwise direction and through the fluid torque converter unit drives the turbine shaft 31 in an anti-clockwise direction at a slower speed than the flywheel 10 due to the fluid slip between the pump element 22 and turbine element 35 of the fluid torque converter unit. The sleeve member 124 also rotates conjointly with the shaft 31 due to the connection therewith through the splines 122 and 123. When the engine flywheel 10 is overrunning the shaft 31 the coil spring friction clutch 94 tends to wrap about the spring carrier 91 and therefore the outer periphery of the spring 94 only lightly frictionally engages the clutch drum 20. In this condition of operation the spring carrier 91 rotates with the shaft 31.

When substantially synchronous speed is reached between the engine flywheel 10 and the shaft 31, the coil spring friction clutch 94 expands radially increasing its frictional engagement with the clutch drum 20 which tends to cause the spring carrier 91 to rotate with the clutch drum 20 and the engine flywheel 10. The spring carrier 91 thus tends to rotate clockwise relative to clutch element 82 which through the helical threads 89 and 90 causes the clutch element 82 to be threaded to the left as viewed in Figure 1a. Upon movement of the clutch element 82 to the left, the ramps 85 of clutch teeth 83 will engage the ramps 87 of clutch teeth 84. Engagement of the driving faces 86 and 88 of the clutch teeth 83 and 84 will take place when the shaft 31 initially begins to overrun the flywheel 10. That is, when the flywheel rotates clockwise relative to the shaft 31. Engagement of the clutch teeth 83 and 84 will be completed in less than 20° of overrunning of the shaft 31 relative to the flywheel 10.

Upon acceleration of the engine flywheel 10 relative to the shaft 31 the coil spring friction clutch 94 again wraps about the spring carrier 91. Frictional engagement of the spring 94 with the clutch drum 20 is decreased and the spring carrier 91 again rotates with the shaft 31. Also, upon acceleration of the engine flywheel 10 the clutch teeth 83 will be thrust out of engagement with the clutch teeth 84 due to the camming action between the ramps 85 and 87 and the helical threads 89 and 90 which will effect movement of the clutch element 82 to the right to the position shown in Figure 1a. Drive between the flywheel 10 and the shaft 31 is then returned through the fluid torque converter unit.

The above described clutch construction will permit drive to be effected from the flywheel 10 to the shaft 31 through the fluid torque converter unit when acceleration is desired and will couple the engine flywheel 10 and the shaft 31 together when substantially synchronous speed is reached. Thus when the vehicle is coasting and the shaft 31 begins to overrun the flywheel 10, the flywheel 10 and shaft 31 are clutched together thus making it possible for the engine to act as a brake on the vehicle. The clutch construction also locks the flywheel 10 and shaft 31 together when the vehicle is being pushed, thus permitting the engine to be started should the starter motor fail.

If it should be desired to clutch the flywheel 10 and shaft 31 together in both directions of relative rotation after synchronous speed between the engine flywheel 10 and shaft 31 has once been reached, fluid under pressure is selectively admitted to the chamber between the piston 103 and the closure member 108 mounted within the shaft 31. Admission of fluid under pressure causes the piston 103 together with the rod 102 and the member 100 to be urged to the left from the position shown in Figure 1. During this shifting movement the inner end of pin member 96 remains stationary so that it is disposed in the right hand end of slot 101 in the member 100. At the completion of the shift the pin member 96 is thus spring loaded by means of the spring 107 acting through the sleeve member 99. Although the pin member 96, together with the clutch element 73, is spring loaded, movement to the left does not take place due to the fact that the spring ring 97 engages the rear end of the clutch collar member 82. However, at substantially synchronous speed of the engine flywheel 10 and shaft 31, when the latter initially begins to overrun the flywheel 10 as described above, the coil spring 94 engaging the clutch drum 20 causes the spring carrier 91 to tend to rotate with the clutch drum 20. The tendency of the spring carrier 91 to rotate with the clutch drum 20 causes the threads 89 and 90 to effect movement of the clutch element 82 to the left as viewed in Figure 1a, thereby disposing the clutch teeth 83 into engagement with clutch teeth 84.

Movement of the clutch element 82 to the left permits movement of the spring loaded clutch element 73 to the left. At the moment that the clutch teeth 83 and 84 begin to engage the ramps of clutch teeth 74 will engage the ramps 78 of clutch teeth 75. The instant before the clutch teeth 83 and 84 are in complete engagement, the spring biased shift means will snap the clutch teeth 74 substantially into driving relation with the clutch teeth 75. However, before the driving faces 77 and 79 of clutch teeth 74 and 75 are disposed in driving engagement, the flywheel 10 must be accelerated. Engagement of clutch teeth 83 and 84 and 74 and 75 is effected without gear clash or shock. When the clutch element 73 is in its extreme left position the pin member 96 is disposed at the left end of the slot 95 formed in shaft 31 and hub 38 with the spring ring 97 abutting the end of the clutch element 82. The inner end of pin member 96 is also disposed at the left end of slot 101 formed in member 100. The spring 107 acting through the sleeve member 99 and pin member 96 maintains the clutch elements 82 and 73 in their extreme left positions irrespective of whether the flywheel 10 is tending to overrun the shaft 31 or vice versa.

When it is desired to disengage the clutch element 73 fluid under pressure is bled from the chamber between piston 103 and retainer member 108. The coil spring 104 at the left end of shaft 31 as viewed in Figure 1a thereupon urges the member 100, together with the pin member 96 and clutch element 73, to the right to the position shown in Figure 1a. The clutch element 82 will remain in its extreme left position until the engine 10 tends to overrun the shaft 20. As described above, upon overrunning of the engine flywheel 10 relative to the shaft 31 the clutch teeth 83 are disengaged from the clutch teeth 84 as a result of the clutch element 82 being threaded axially to the right to the position shown in Figure 1a.

I shall now describe in detail the manner in which the speed ratios of the transmission of my present invention are selected.

When the shaft 31 and the sleeve member 124 are overrunning the sleeve member 133, the coil spring friction brake 179 of brake mechanism 160 expands radially increasing its frictional engagement with the brake drum 121 which tends to brake the spring carrier 176 to the brake drum 121. Upon braking of the spring carrier 176 to the brake drum 121, the brake element 171 is caused to be threaded to the left, as viewed in Figure 1a, through the helical threads 174 and 175.

When the shaft 31 and sleeve member 124 are overrunning the sleeve member 133, the coil spring friction clutch 190 of clutch mechanism 161 tends to wrap about the spring carrier 187 and therefore the spring 190 only lightly frictionally engages the clutch drum 141. In this condition of operation the spring carrier 187 rotates with the sleeve member 133, and the clutch element 182 is threaded to the left to the position shown in Figure 1b.

When the sleeve member 133 begins to overrun the shaft 31 and sleeve member 124, the coil spring friction clutch 190 expands radially increasing its frictional engagement with the clutch drum 141 which tends to cause the spring carrier 187 to rotate with the clutch drum 141. This causes the clutch element 182 to be threaded to the right from the position shown in Figure 1b by means of the helical threads 185 and 186. Simultaneously, the coil spring friction brake 179 tends to wrap about the spring carrier 176 thereby decreasing its frictional engagement with the brake drum 121. The spring carrier 176 thus tends to rotate with the sleeve member 133 which causes the brake element 171 to be threaded to the right from the position shown in Figure 1a by means of the helical threads 174 and 175.

Axial movement of the hub member 164 is adapted to be effected by means of shift means shown in Figure 5. The shift means comprises a shift fork 206 having bifurcated ends 207. Rotatably mounted in the lower ends of the shift fork 206 are a pair of opposed facing jaw members 208 which are disposed in the annular groove 205 formed in the hub member 164. The shift fork 207, adjacent its upper end, is pivotally mounted by a pivot pin member 209 to the depending leg of a box-like support member 210. The box member 210 is, in turn, fixedly mounted, to a horizontal rod 339 which is either manually or automatically axially shiftable. A plurality of tubular plungers 340 are disposed in vertical openings formed in the box member 210 adjacent each corner thereof. The bottom ends of the plunger 340 are biased, by means of springs 341, into engagement with the end of the shift fork 206 and, while normally maintaining the fork 206 in a vertical position, permit the latter to rock about the pivot pin 209.

The operation of the shift means is as follows. When it is desired to effect actuation of the clutch mechanism 161, the rod 339 and box member 210 are shifted to the right from the position shown in Figure 5. Initially the hub member 164 will remain in the position shown in Figures 1a and 1b while the shift fork 206 pivots or rotates clockwise about the pivot pin 209 compressing the plungers 340 at the left end of the box member 210. After the driving force has been removed from the faces of the brake teeth 165 and 166, the plungers 340, at the left end of the box member 210, will cause the shift work 206 to rotate counter-clockwise about pin member 209, thereby thrusting the hub member 164 to the right, disengaging brake teeth 165 and 166 and disposing the stop member 164b into engagement with the end of clutch element 182. When the clutch element 182 is threaded to the right and the clutch teeth 183 and 184 are engaged, the leading edges of clutch teeth 167 will be disposed into contact with the leading edges of clutch teeth 168. The clutch teeth 167 will slide over the clutch teeth 168 until synchronous speed is reached, whereupon the teeth 167 will be thrust into full engagement with the teeth 168. It will be understood that the hub member 164 may be spring biased or loaded in either axial direction by appropriately shifting the rod 339.

With the vehicle standing still and low range forward drive selected, the brake mechanism 160 and clutch mechanism 161 are disposed in the position shown in Figures 1a and 1b. The clutch collar member 150 is also moved to the left from the position shown in Figure 1b so that the splines 149 are disposed in engagement with the clutch teeth 146. With the hub member 164 spring biased to the left, it will be understood that irrespective of the direction of rotation of the sleeve member 133 relative to the sleeve member 124, the teeth 165 and 172 will remain in engagement with the teeth 166 and 173. With the brake mechanism 160 engaged, as shown, the planet carrier 135 of the planet assembly 132 is held against rotation. Upon acceleration of the engine, drive will be effected from the engine flywheel 10 to the output shaft 125 through the fluid torque converter unit, shaft 31, sleeve member 124, sun gear 131, compound planetary pinions 156, gear 145, and clutch collar member 150.

If high range drive in a forward direction is desired, the hub member 164 is spring biased to the right from the position shown in Figures 1a and 1b until the shoulder 164b abuts the end of the clutch element 182. The brake element 171 will remain in its extreme left position until the sleeve member 133 begins to rotate forward. When this occurs, as pointed out above, the brake element 171 will be threaded to the right. The clutch element 182 of clutch mechanism 161 will be threaded to the right until the clutch teeth 183 are disposed in engagement with the clutch teeth 184 which occurs as soon as the sleeve member 133 tends to overrun the sleeve member 124.

Movement of the clutch element 182 to the right permits the spring loaded hub member 164 to move to the right. At the moment that the clutch teeth 183 and 184 begin to engage, the teeth 167 will begin to engage the ramps of teeth 168. The instant before the clutch teeth 183 and 184 are in complete engagement the spring biased shift means will snap the clutch teeth 167 substantially into driving relation with the clutch teeth 168. With the clutch mechanism 161 engaged, the planet ring gear carrier 136 of the planetary mechanism 132 is clutched to the planet carrier 135 and thus high range drive is effected from the engine flywheel 10 through the torque converter unit, shaft 31, planetary mechanism 132 and clutch collar member 150 to the output shaft 125. High range drive in a forward direction will be maintained, as long as hub member 164 is spring biased to the right, irrespective of the relative directions of rotation between the sleeve member 124 and the sleeve member 133.

If it should be desired to return to low range drive in a forward direction, the hub member 164 is biased to the left which causes the latter to move toward the left from the position shown in Figure 1 until the shoulder 164a abuts the end of brake element 171. The clutch element 182 will move from its extreme right position when the sleeve member 124 begins to overrun the sleeve member 133. When this occurs the clutch element 182 is threaded axially to the left to the position shown in Figure 1. As fully described above, the brake element 171 is threaded axially to the left until the teeth 172 are disposed in engagement with the teeth 173 by the tendency of sleeve member 133 to rotate clockwise. As the brake element 171 moves to the left, the hub member 164 simultaneously moves to the left. At the moment that the teeth 172 and 173 begin to engage, the teeth 165 and 166 will begin to engage also. The instant before the teeth 172 and 173 are in complete engagement, the ramps of teeth 165 will slide over the ramps of teeth 166 and be snapped into engaged relation with the teeth 166 thus completing the shift.

From the foregoing description it will be apparent that when it is desired to shift from low to high range the hub member 164 is spring biased to the right, and the throttle is momentarily closed to allow the spring biased hub 164 to be moved to the right and engage the shoulder 164b against member 183. When the coasting tends to cause sleeve member 133 to overrun shaft 124 the shift will be completed and the throttle may be re-opened to drive or closed as desired. The shift from high to low range is accomplished by spring biasing the hub member 164 to the left towards the position shown in Figures 1a and 1b and then momentarily reducing the throttle until the high range is released. The shift is completed by reopening the throttle to cause the low range clutch to lock after which the throttle may be opened or closed as desired.

If reverse drive is desired, the brake band 191 is disposed in engagement with the planet ring gear carrier 136, thereby holding the latter against rotation, after which the clutch collar member 150 is shifted to the right until the clutch teeth 151 are disposed in engagement with the clutch teeth 147 of the planet ring gear carrier 136. The brake band 191 is then released and the brake mechanism 160 is engaged. Reverse drive is then effected from the engine flywheel 10 through the torque converter unit, shaft 31, sleeve member 124, sun gear 131, pinion portions 157 of the compound planet pinions 156, gear portion 159 of the planet ring gear carrier 136, and hence through the clutch collar member 150 to the output shaft 125.

If forward drive is again desired, the brake band 191 is disposed in braking engagement with the planet ring gear carrier 136, and the clutch collar mmeber 150 is then shifted to the left until the splines 149 are disposed in engagement with the clutch teeth 146 of the hub member 144. The brake band 191 is then released from engagement with the planet ring gear carrier 136, after which the desired speed ratio may be selected by actuating the brake mechanism 160 or the clutch mechanism 161, as fully described above.

Referring now to Figures 4a and 4b, I shall describe in connection therewith another form of transmission of my present invention.

Prime reference numerals have been used in Figures 4a and 4b to designate the elements which are the same or similar to the elements of the form of my transmission shown in Figures 1a and 1b.

In the second form of my transmission, the main tubular turbine shaft 31' at the rear end thereof is formed with a radially extending flange portion 211, to which, at the outer periphery thereof, is secured the inwardly radially extending flange portion 212 of an axially rearwardly extending annular clutch drum 215, which is provided for a purpose to be described fully hereinafter. The rear end of the shaft 31' is formed with internal straight splines 216, which mate with the external straight splines 217 of a rearwardly extending sleeve member 218. The sleeve member 218 thus rotates conjointly with the shaft 31'.

The forward end of an intermediate shaft 219 is journaled in a plurality of needle bearings 220 suitably arranged within the sleeve member 218, adjacent the forward end thereof. The intermediate shaft 219, adjacent its rear end, is journaled within a ball bearing assembly 221 mounted in an intermediate transmission wall 222 secured by bolts 223 to the transmission housing 30'.

Secured to the sleeve member 218, adjacent the rear end thereof, is a sun gear 224 which forms part of a planetary gear assembly, indicated generally by the reference numeral 225. A sleeve member 226 is disposed concentrically about the sleeve member 218 and the sleeve member 226, at the forward end thereof, is journaled on a plurality of needle bearings 227 which are arranged about the outer periphery of the sleeve member 218. The sleeve member 226, adjacent its rear end, is formed with a radially extending flange portion 228 which serves as a planet carrier for the planetary gear assembly 225. A stepped hub member 229 is suitably secured to the intermediate shaft 219, intermediate of the ends thereof. The stepped hub member 229 is also journaled on a ball bearing assembly 230, suitably mounted at the rear end of the sleeve member 218, immediately rearwardly of the sun gear 224. The stepped hub member 229, at the outer periphery thereof, is formed with gear teeth 231.

Suitably arranged concentrically about the sun gear 224 and the gear portion 231 of the stepped hub member 229 are a plurality of axially extending circumferentially spaced pin members 232 which are mounted at their forward ends in the radially extending flange portion 228 of the sleeve member 226. The pin members 232 at their rear ends are fixed in an annular ring member 233 which, at its inner periphery, is journaled on the stepped hub member 229. Journaled on the pin members 232 are compound planet pinions 234 which each comprise pinion portions 235 and 236. The pinion portions 235 have meshing engagement with the sun gear 224 and the pinion portions 236 have meshing engagement with the gear portion 231 of the stepped hub member 229.

Mounted concentrically about the sleeve member 226, intermediate of the transmission housing wall 29' and the planetary gear assembly 225, is a clutch or torque transmitting mechanism indicated generally at 237 and a brake or torque transmitting mechanism indicated at 238. The forward end of sleeve member 226 is formed with external straight splines 242 which receive the internal straight splines 243 of a hub member 244. The hub 244 at its outer periphery, intermediate the ends thereof, is formed with an annular groove 245 which is adapted to receive the spring biased shift fork of shift means shown, for example, in Figure 5. The outer periphery of the hub member 244 is also formed with axially spaced annular shoulders 246 and 247. The hub member 244, at its forward end, is formed with radially extending circumferentially spaced jaw clutch or ratchet teeth 248 which are adapted to be disposed selectively in meshing engagement with radially extending circumferentially spaced jaw clutch or ratchet teeth 249 formed integrally with the radial flange 211 of the shaft 31'. The hub member 244 at its rear end is formed with radially extending circumferentially spaced jaw clutch or ratchet teeth 250 which are adapted to be disposed selectively in engagement with radially extending circumferentially spaced jaw clutch or ratchet teeth 251 formed integrally with a ring member 252 suitably secured as, for example, by rivets 253 to an intermediate transmission wall 254 which is secured at its outer periphery by the bolts 223 to the transmission housing 30'.

The hub member 244 at its forward end is formed with external straight splines 255 which mesh with the internal straight splines 256 of a clutch ring or element 257. The clutch element 257 at its forward end is formed with a plurality of radially extending circumferentially spaced jaw clutch or ratchet teeth 258 which are adapted to be disposed selectively in engagement with a plurality of radially extending circumferentially spaced jaw clutch or ratchet teeth 259 formed on the radial flange 211 of shaft 31'.

The clutch element 257 is formed with external helical threads or splines 260 which cooperate with the internal helical threads or splines 261 formed in an annular spring carrier member 262 fixed against axial movement between the radial flange 211 and a thrust washer 263 positioned in the aforedescribed clutch drum 215 by a retainer ring 264. The spring carrier 262 at its outer periphery carries a coil spring friction clutch 265 which is fixed at one end in the spring carrier 262 and is free at its other end. The spring 265 at its outer periphery is adapted to normally lightly frictionally engage the inner periphery of the clutch drum 215.

The rear end of the hub member 244 is formed with external straight splines 266 which cooperate with the internal straight splines 267 of a brake ring or element 268. The brake element 268 is formed with a plurality of radially extending circumferentially spaced brake or ratchet teeth 269 which are adapted to be disposed selectively in engagement with a plurality of radially extending circumferentially spaced brake or ratchet teeth 270 formed on the ring member 252.

The brake element 268 is formed with external helical threads or splines 271 which cooperate with the internal helical threads or splines 272 formed in an annular spring carrier member 273 fixed against axial movement between the ring member 252 and a thrust washer 274 positioned in an axially forwardly extending brake drum 275 by a retainer ring 276. The brake drum 275 is suitably secured to the transmission wall 254 by the aforedescribed rivets 253. The spring carrier 273 at its outer periphery carries a coil spring friction brake 277 which is fixed at one end in the spring carrier 273 and is free at its other end. The spring 277 at its outer periphery is adapted normally to lightly frictionally engage the inner periphery of the brake drum 275.

When the clutch mechanism 237 is in an engaged position, as shown in Figure 4a, the planet carrier 228 is clutched to the shaft 31' thus causing the planetary gear assembly to rotate as a unit whereby direct drive is effected between the shaft 31' and the sleeve member 229. When the clutch mechanism 237 is disengaged and the brake mechanism 238 is engaged, the planet carrier 228 is locked to the transmission wall 254 and thus held against rotation which provides for a low range drive between the shaft 31' and the sleeve 218 through the planetary gear mechanism 225.

The rear end of the intermediate shaft 219 is formed with internal straight splines 301 which mate with the external straight splines 302 of a rearwardly extending sleeve member 303. The sleeve member 303 thus rotates conjointly with the shaft 219.

The forward end of an output shaft 304 is journaled in a plurality of needle bearings 305 which are arranged within the sleeve member 303. The output shaft 304, adjacent its rear end, is journaled within a ball bearing assembly 306 mounted in the rear end wall 307 of the transmission housing 30'.

Secured to the sleeve member 303, adjacent the rear end thereof, is a sun gear 308 which forms part of a planetary gear assembly, indicated generally by the reference numeral 309. A sleeve member 310 is disposed concentrically about the sleeve member 303 and the sleeve member 310, at the forward end thereof, is journaled on a plurality of needle bearings 311 which are arranged about the outer periphery of the sleeve member 303. The sleeve member 310, adjacent its rear end, is formed with a radially extending flange portion 312 which serves as a planet carrier for the planetary gear assembly 309.

Disposed concentrically about the radial flange 312 of sleeve member 310 and the sun gear 308 is a two-piece planetary ring gear carrier 313, which at its forward end has a radially inwardly extending flange portion 314 secured by rivets 315 to an annular ring member 316 journaled on an annular bushing member 317 mounted on the sleeve member 310 adjacent the radial flange 312. Formed integrally with the inwardly extending radial flange 314 is an axially forwardly extending clutch drum portion 318 provided for a purpose to be described hereinafter. The planetary ring gear carrier 313 at its rear end is formed with a radially inwardly extending flange portion 319 journaled at its inner periphery on an annular bushing member 320 mounted on a stepped hub member 321 which is suitably mounted on the output shaft 304. The stepped hub member 321 is also journaled on a ball bearing assembly 322 mounted on the sleeve member 303 adjacent the rear end thereof immediately rearwardly of the sun gear 308. The stepped hub member 321 is formed with external gear teeth 323 and external jaw clutch teeth 324. The inwardly directed radial flange 319 of the planet ring gear carrier 313 is formed with internal jaw clutch teeth 325.

The output shaft 304, adjacent to and forwardly of the ball bearing assembly 306, is formed with external straight splines 326 on which are mounted the internal straight splines 327 of an annular axially shiftable clutch collar member 328. The clutch collar member 328 is formed with external jaw clutch teeth 329 which are adapted to be selectively disposed in engagement with the jaw clutch teeth 325. Axial movement of the clutch collar member 328 is adapted to be effected through suitable manually or automatically actuated shift means, indicated generally by the reference numeral 330. With the member 328 in the position shown in Figure 4b, the transmission is in neutral. When the clutch collar member 328 is shifted to the left from the position shown in Figure 4b, the splines 327 of member 328 are disposed in meshing engagement with the external jaw clutch teeth 324 of the stepped hub member 321 for effecting a forward drive to the output shaft 304. When the clutch collar member 328 is shifted to the right, from the position shown in Figure 4b, the external jaw clutch teeth 329 are disposed in meshing engagement with the internal jaw clutch teeth 325 of the planetary ring gear carrier 313 for effecting a reverse drive to the output shaft 304.

Arranged within the planetary ring gear carrier 313 are a plurality of axially extending circumferentially spaced pin members 336 which are mounted at their forward ends in the radially extending flange portion 312 of the sleeve member 310. The pin members 336 at their rear ends are fixed in an annular ring member 337 which, at its inner periphery, is journaled on an annular bushing member 338 mounted on a shoulder formed at the inner periphery of the radially inwardly extending flange portion 319 of the planetary ring gear carrier 313. Suitably journaled on the pin members 336 are compound planet pinions 339 which each comprise pinion portions 340 and 341. The pinion portions 340 have meshing engagement with the sun gear 308 fixed to the sleeve member 303 and also have meshing engagement with an internal gear portion 342 formed in the planetary ring gear carrier 313. The pinion portions 341 have meshing engagement with the gear portion 323 of the stepped hub member 321.

Mounted concentrically about the sleeve member 310, intermediate of the transmission wall 222 and the planetary ring gear carrier 313, is a brake or torque transmitting mechanism, indicated generally at 343, and a clutch or torque transmitting mechanism, indicated generally at 344, the constructions of which I shall now describe in detail.

The forward end of sleeve member 310 is formed with external straight splines 345 which receive the internal straight splines 346 of an annular hub member 347. Axial movement of the hub member 347 is effected by shift means shown, for example, in Figure 5. The hub member 347 is formed with annular shoulders 391 and 392. The hub member 347 at its forward end is formed with radially extending circumferentially spaced brake or ratchet teeth 348, which are adapted to be disposed selectively in meshing engagement with radially extending circumferentially spaced brake or ratchet teeth 349 formed integrally with an annular ring member 350 suitably secured to the transmission wall 222 by a plurality of circumferentially spaced bolts 351. The hub member 347 at its rear end is formed with radially extending circumferentially spaced jaw clutch or ratchet teeth 352 which are adapted to be disposed selectively in engagement with radially extending circumferentially spaced jaw clutch or ratchet teeth 353 formed integrally with the ring member 316 supporting the forward flange 314 of the planetary ring gear carrier 313.

The hub member 347 at its forward end is formed with external straight splines 354 which mesh with the internal straight splines 355 of a brake element 356. The brake element 356 at its forward end is formed with a plurality of radially extending circumferentially spaced brake or ratchet teeth 357 which are adapted to be disposed selectively in engagement with a plurality of radially extending circumferentially spaced brake or ratchet teeth 358 formed on the ring member 350.

The brake element 356 is formed with external helical threads or splines 359 which cooperate with the internal helical threads or splines 360 formed in an annular spring carrier member 361 fixed against axial movement between the ring member 350 and a thrust washer 362 positioned in an annular axially rearwardly extending brake drum 363 by a retainer ring 364. The brake drum 363 is suitably secured to the transmission wall 222. The spring carrier 361 at its outer periphery carries a coil spring friction brake 365 which is fixed at one end in the spring carrier 361 and is free at its other end. The spring 365 at its outer periphery is adapted to normally lightly frictionally engage the inner periphery of the brake drum 363.

The rear end of the hub member 347 is formed with external straight splines 366 which cooperate with the internal straight splines 367 of a clutch element 368. The clutch element 368 is formed with a plurality of radially extending circumferentially spaced jaw clutch or ratchet teeth 369, which are adapted to be disposed selectively in engagement with a plurality of radially extending circumferentially spaced jaw clutch or ratchet teeth 370 formed on the ring member 316 supporting the forward flange 314 of the planet ring gear carrier 313.

The clutch element 368 is formed with external helical threads or splines 371 which cooperate with the internal helical threads or splines 372 formed in an annular spring carrier member 373 fixed against axial movement between the forward radially inwardly extending flange 314 of the planet ring gear carrier 313 and a thrust washer 374 positioned in the clutch drum 318 by a retainer ring 375. The spring carrier 373 at its outer periphery carries a coil spring friction clutch 376 which is fixed at one end in the spring carrier 373 and is free at its other end. The spring 376 at its outer periphery is adapted normally to lightly frictionally engage the inner periphery of the clutch drum 318.

A suitable brake band 377 is disposed about the planet ring gear carrier 313 and is provided for braking the latter when the clutch collar member 328 is to be shifted axially between forward, neutral and reverse. The brake band 377 is adapted to be disposed in braking engagement with the planet ring gear carrier 313 by means of brake actuating means of the character, for example, shown in my copending application, Serial No. 225,642, filed May 10, 1951, now Patent No. 2,656,105.

The rear end of the output shaft 304 outwardly of the transmission housing 30' is formed with external straight splines 378 which cooperate with the internal straight splines 379 of a hub member 380. The hub member 380 is formed with a radially outwardly extending flange portion 381, to which at its outer periphery, is secured, as by bolts 382, a brake drum 383. A suitable brake band 384 is disposed about the brake drum 383 and when the brake band 384 is applied, the output shaft 304 is held against rotation. Any suitable actuating means (not shown) may be provided for applying the brake band 384 to the brake drum 383.

An annular flange member 385 is secured as by bolts 386 to the rear end wall 307 of the transmission housing 30' and a suitable oil seal 387 is disposed between the inner periphery of the flange member 385 and the outer periphery of the hub member 380. Also secured to the hub member 380 is a worm gear 388, which has meshing engagement with a gear 389 provided for driving a speedometer. A suitable nut 390 is threaded onto the rear end of the output shaft 304 and is provided for maintaining the hub member 380 on the output shaft 304.

The operation of the clutch mechanisms 237 and 344 is the same as the operation of the clutch mechanism 161 described above in connection with the first embodiment of my present invention. The operation of the brake mechanisms 238 and 343 is the same as the operation of the brake mechanism 160 described above in connection with the first form of my present invention. It is, therefore, believed that it is unnecessary to describe in detail the operation of the brake mechanisms 238 and 343 and the clutch mechanisms 237 and 344.

The second form of transmission of my present invention provides for four forward drive ratios and two reverse drive ratios. When the clutch collar member 328 is shifted to the left, from the position shown in Figure 4b, so as to dispose the splines 327 into engagement with the jaw clutch teeth 324 of the stepped hub member 321, forward drive in low speed is effected by engaging the brake mechanisms 238 and 343. If second speed is desired, the brake mechanism 343 is disengaged and the clutch mechanism 344 is engaged which is accomplished by biasing the hub member 347 to the right and closing the throttle. As will be readily apparent to those skilled in the art, when the clutch mechanism 344 is engaged, the elements of the planetary gear mechanism 309 are locked together for conjoint rotation and thus direct drive is effected from the shaft 219 to the output shaft 304. When third ratio drive or third speed is desired, the brake mechanism 238 is disengaged and the clutch mechanism 237 is engaged which is accomplished by biasing the hub member 244 to the left and momentarily reducing the throttle. As will be readily apparent when the clutch mechanism 237 is engaged, the elements of the planetary gear mechanism 225 are locked together and direct drive is effected between the shaft 31' and the intermediate shaft 219. Also, for third speed drive, the clutch mechanism 344 is disengaged and the brake mechanism 343 is engaged, which holds the planet carrier 312 of the planetary gear mechanism 309 against rotation. The brake mechanism 343 is engaged by biasing the hub member 347 to the left and momentarily reducing the throttle. For third speed drive, the clutch mechanism 237 and brake mechanism 343 are engaged substantially simultaneously. Drive is thus effected from the intermediate shaft 219 through the compound planet pinions 339 of the planetary gear mechanism 309, and hence to the output shaft 304. When high speed drive or fourth speed drive is desired, the brake mechanism 343 is disengaged and the clutch mechanism 344 is engaged, which locks the elements of the planetary gear mechanism 309 together for effecting direct drive between the intermediate shaft 219 and the output shaft 304. The clutch mechanism 344 is engaged by biasing the hub member 347 to the right and closing the throttle. In fourth speed, the elements of both of the planetary gear mechanisms 225 and 309 are locked together and thus direct drive is effected from the turbine shaft 31' to the output shaft 304.

If reverse drive is desired, the brake band 377 is applied to the planet ring gear carrier 313 and the clutch collar member 328 is shifted to the right, from the position shown in Figure 4b, until the jaw clutch teeth 329 thereof are disposed in engagement with the jaw clutch teeth 325 of the planet ring gear carrier 313.

If low speed reverse drive is desired, brake mechanisms 238 and 343 are engaged. Drive is then effected from the turbine shaft 31' through the compound planet pinions 234 of the planetary gear mechanism 225 and hence through the compound planet pinions 339 of the planetary gear mechanism 309 to the gear portion 342 of the planet ring gear carrier 313, and finally to the output shaft 304. If high speed reverse drive is desired, the brake mechanism 238 is disengaged and the clutch mechanism 237 is engaged. The elements of the planetary gear mechanism 225 are thus locked together and direct drive is effected from the turbine shaft 31' to the intermediate shaft 219 and hence drive is effected through the compound planet pinions 339 of the planetary gear mechanism 309 to the gear portion 342 of the planetary ring gear carrier 313, and hence to the output shaft 304.

It will be understood that the pump and turbine elements of the second form of my transmission may be locked together for direct drive in the same manner as the pump and turbine elements of the first form of my transmission shown in Figures 1a and 1b.

Now, while I have shown and described what I believe to be preferred embodiments of my present invention, it will be understood that various rearrangements and modifications may be made therein without departing from the spirit and scope of my present invention.

I claim:

1. In a transmission having a housing, a drive member, a driven member, a first axially movable brake element adapted for braking said driven member to said housing, a second axially movable brake element adapted for braking said driven member to said housing, means for effecting engagement of said second brake element upon rotation of said drive member in one direction relative to said driven member and for effecting disengagement of said second brake element upon rotation of said drive member in the other direction relative to said driven member, means for preventing engagement of said first brake element when said second brake element is disengaged and for preventing disengagement of said second brake element when said first brake element is engaged, a first axially movable clutch element adapted for clutching said driven member to said drive member, a second axially movable clutch element adapted for clutching said driven member to said drive member, means for effecting engagement of said second clutch element upon rotation of said drive member in one direction relative to said driven member and for effecting disengagement of said second clutch element upon rotation of said drive member in the opposite direction relative to said driven member, and means for preventing engagement of said first clutch element when said second clutch element is disengaged and for preventing disengagement of said second clutch element when said first clutch element is engaged.

2. In a transmission having a housing, a drive member, a driven member, a hub member non-rotatably mounted on said driven member and axially movable therealong, a first brake element at one end of said hub member for braking said driven member to said housing, a second brake member non-rotatably mounted relative to said first brake element and axially movable for braking said driven member to said housing, means for effecting axial movement of said second brake element whereby the latter is engaged upon rotation of said drive member in one direction relative to said driven member and said second brake element is disengaged upon rotation of said drive member in the other direction relative to said driven member, means for preventing engagement of said first brake element when said second brake element is disengaged and for preventing disengagement of said second brake element when said first brake element is engaged, a first clutch element at the other end of said hub member adapted for clutching said driven member to said drive member, a second clutch element non-rotatably mounted relative to said first clutch element and axially movable therealong for clutching said driven member to said drive member, means for effecting axial movement of said second clutch element whereby the latter is engaged upon rotation of said drive member in one direction relative to said driven member and said second clutch element is disengaged upon rotation of said drive member in the other direction relative to said driven member, and means for preventing engagement of said first clutch element when said second clutch element is disengaged and for preventing disengagement of said second clutch element when said first clutch element is engaged.

3. In a transmission having a housing, a drive member, a driven member, a hub member non-rotatably mounted on said driven member and axially movable therealong, a first brake element at one end of said hub member adapted for braking said driven member to said housing for preventing rotation of said driven member in one direction, a second brake element non-rotatably mounted relative to said first brake element and axially movable therealong, said second brake element being adapted for braking said driven member to said housing for preventing rotation of said driven member in the other direction, external helical threads formed on said second brake element, an axially fixed annular spring carrier having internal helical threads cooperating with the external helical threads on said second brake element, a coil spring friction brake carried on the outer periphery of said spring carrier, said coil spring friction brake being operable upon rotation of said drive member in one direction relative to said driven member to brake said spring carrier to said housing for causing said second brake element to be threaded axially whereby the latter is engaged, said second brake element being disengaged upon rotation of said drive member in the other direction relative to said driven member, means for preventing engagement of said first brake element when said second brake element is disengaged and for preventing disengagement of said second brake element when said first brake element is engaged, a first clutch element at the other end of said hub member adapted for clutching said driven member to said drive member in one direction of rotation of said drive member relative to said driven member, a second clutch element non-rotatably mounted relative to said first clutch element and axially movable therealong for clutching said driven member to said drive member in the other direction of rotation of said drive member relative to said driven member, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member causing said second clutch element to be threaded axially whereby said second clutch element is engaged, said second clutch element being disengaged upon rotation of said drive member in the other direction relative to said driven member, and means for preventing engagement of said first clutch element when said second clutch element is disengaged and for preventing disengagement of said second clutch element when said first clutch element is engaged.

4. The combination of claim 3 wherein the means for preventing engagement of said first brake element when said second brake element is disengaged and for preventing disengagement of said second brake element when said first brake element is engaged comprises a first annular shoulder formed integrally with said hub member, and the means for preventing engagement of said first clutch element when said second clutch element is disengaged and for preventing disengagement of said second clutch element when said first clutch element is engaged comprises a second annular shoulder formed integrally with said hub member.

5. In a transmission having a housing, a drive member, a driven member, a planetary gear assembly comprising three elements, namely, a sun gear, planet pinion means and a planet ring gear carrier, one of said elements of said planetary gear assembly having driving connection with said drive member, one of said elements of said planetary gear assembly having driving connection with said driven member, a first axially movable brake element adapted for braking one of said elements of said planetary gear assembly to said housing, a second axially movable brake element adapted for braking said one element of said planetary gear assembly to said housing, means for effecting engagement of said second brake element upon rotation of said drive member in one direction relative to said driven member and for effecting disengagement of said second brake element upon rotation of said drive member in the other direction relative to said driven member, means for preventing engagement of said first brake element when said second brake element is disengaged and for preventing disengagement of said second brake element when said first axially movable brake element is engaged, a first clutch element adapted for clutching two of said elements of said planetary gear assembly together, a second axially movable clutch element adapted for clutching said two elements of said planetary gear assembly together, means for effecting engagement of said second clutch element upon rotation of said drive member in one direction relative to said driven member and for effecting disengagement of said second clutch element upon rotation of said drive member in the other direction relative to said driven member, and means for preventing engagement of said first clutch element when said second clutch element is disengaged and for preventing disengagement of said second clutch element when said first clutch element is engaged.

6. In a transmission having a housing, a drive member, a sun gear fixed to said drive member, a planet carrier disposed about said drive member, compound planet pinions carried by said planet carrier and having meshing engagement with said sun gear, a driven member, a gear on said driven member having meshing engagement with said compound planet pinions, a planet ring gear carrier arranged concentrically about said planet pinions and having meshing engagement therewith, clutch means for clutching either said planet ring gear carrier or said gear on said driven member to the latter, a brake element adapted for braking said planet ring gear carrier to said housing, means for effecting engagement of said brake element upon rotation of said planet carrier in one direction relative to said housing and for effecting disengagement of said brake element upon rotation of said planet carrier in the other direction relative to said housing, a clutch element adapted for clutching said planet carrier to said planet ring gear carrier, means for effecting engagement of said clutch element upon rotation of said planet carrier in one direction relative to said planet ring gear carrier and for effecting disengagement of said clutch element upon rotation of said planet carrier in the other direction relative to said planet ring gear carrier.

7. In a transmission having a housing, a drive member, a sun gear fixed to said drive member, a planet carrier disposed about said drive member, compound planet pinions carried by said planet carrier and having meshing engagement with said sun gear, a driven member, a gear on said driven member having meshing engagement with said compound planet pinions, a planet ring gear carrier arranged concentrically about said planet pinions and having meshing engagement therewith, clutch means for selectively clutching either said planet ring gear carrier or said gear on said driven member to the latter, a first brake element adapted for braking said planet carrier to said housing, a second brake element adapted for braking said planet carrier to said housing, means for effecting engagement of said second brake element upon rotation of said planet carrier in one direction relative to said housing and for effecting disengagement of said second brake element upon rotation of said planet carrier in the other direction relative to said housing, means for preventing engagement of said first brake element when said second brake element is disengaged and for preventing disengagement of said second brake element when said first brake element is engaged, a first clutch element adapted for clutching said planet carrier to said planet ring gear carrier, a second clutch element adapted for clutching said planet carrier to said planet ring gear carrier, means for effecting engagement of said second clutch element upon rotation of said planet carrier in one direction relative to said planet ring gear carrier and for effecting disengagement of said second clutch element upon rotation of said planet carrier in the opposite direction relative to said planet ring gear carrier, and means for preventing engagement of said first clutch element when said second clutch element is disengaged and for preventing disengagement of said second clutch element when said first clutch element is engaged.

8. In a transmission having a housing, a drive member, a sun gear fixed to said drive member, a planet carrier disposed about said drive member, compound planet pinions carried by said planet carrier and having meshing engagement with said sun gear, a driven member, a gear on said driven member having meshing engagement with said compound planet pinions, a planet ring gear carrier arranged concentrically about said planet pinions and having meshing engagement therewith, clutch means for selectively clutching said planet ring gear carrier or said gear on said driven member to the latter, an annular hub member non-rotatably mounted on said planet carrier and axially movable therealong, a first brake element at one end of said hub member for braking said planet carrier to said housing, a second brake element non-rotatably mounted relative to said first brake element and axially movable for braking said planet carrier to said housing, means for effecting axial movement of said second brake element whereby the latter is engaged upon rotation of said planet carrier in one direction relative to said housing and said second brake element is disengaged upon rotation of said planet carrier in the other direction relative to said housing, means for preventing engagement of said first brake element when said second brake element is disengaged and for preventing disengagement of said second brake element when said first brake element is engaged, a first clutch element at the other end of said hub member adapted for clutching said planet carrier to said planet ring gear carrier, a second clutch element non-rotatably mounted relative to said first clutch element and axially movable therealong, said second clutch element being adapted for clutching said planet carrier to said planet ring gear carrier, means for effecting axial movement of said second clutch element whereby the latter is engaged upon rotation of said planet carrier in one direction relative to said planet ring gear carrier and said second clutch element is disengaged upon rotation of said planet carrier in the other direction relative to said planet ring gear carrier, and means for preventing engagement of said first clutch element when said second clutch element is disengaged and for preventing disengagement of said second clutch element when said first clutch element is engaged.

9. In a transmission having a housing, a drive member, a sun gear fixed to said drive member, a planet carrier disposed about said drive member, compound planet pinions carried by said planet carrier and having meshing engagement with said sun gear, a driven member, a gear on said driven member having meshing engagement with said compound planet pinions, a planet ring gear carrier arranged concentrically about said planet pinions and having meshing engagement therewith, clutch means for selectively clutching either said planet ring gear carrier or said gear on said driven member to the latter, an annular hub member non-rotatably mounted on said planet carrier and axially movable therealong, a first brake element at one end of said hub member adapted for braking said planet carrier to said housing for preventing rotation of said planet carrier in one direction, a second brake element non-rotatably mounted relative to said first brake element and axially movable therealong, said second brake element being adapted to brake said planet carrier to said housing for preventing rotation of said planet carrier in the other direction, external helical threads formed on said second brake element, an axially fixed annular spring carrier having internal helical threads cooperating with the external helical threads on said second brake element, a coil spring friction brake carried on the outer periphery of said spring carrier, said coil spring friction brake being operable upon rotation of said planet carrier in one direction relative to said housing to brake said spring carrier to said housing for causing said second brake element to be threaded axially whereby the latter is engaged, said second brake element being disengaged upon rotation of said planet carrier in the other direction relative to said housing, means for preventing engagement of said first brake element when said second brake element is disengaged and for preventing disengagement of said second brake element when said first brake element is engaged, a first clutch element at the other end of said hub member adapted for clutching said planet carrier to said planet ring gear carrier in one direction of rotation of said planet carrier relative to said planet ring gear carrier, a second clutch element non-rotatably mounted relative to said first clutch element and axially movable therealong for clutching said planet carrier to said planet ring gear carrier in the other direction of rotation of said planet carrier relative to said planet ring gear carrier, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said planet carrier in one direction relative to said planet ring gear carrier to clutch said spring carrier to said planet ring gear carrier causing said second clutch element to be threaded axially whereby said second clutch element is engaged, said second clutch element being disengaged upon rotation of said planet carrier in the other direction relative to said planet ring gear carrier, and means for preventing engagement of said first clutch element when said second clutch element is disengaged and for preventing disengagement of said second clutch element when said first clutch element is engaged.

10. In a transmission having a housing, a torque converter unit comprising pump and turbine elements, a first clutch element for clutching said pump and turbine elements together, a second clutch element for clutching said pump and turbine elements together, means for effecting engagement of said second clutch element when said turbine element tends to overrun said pump element and for effecting disengagement of said second clutch element when said pump element tends to overrun said turbine element, means for preventing engagement of said first clutch element when said second clutch element is disengaged and for preventing disengagement of said second clutch element when said first clutch element is engaged, a drive member driven from said turbine element, a driven member, a planetary gear assembly comprising three elements, namely a sun gear, planet pinion means and a planet cage, one of said elements of said planetary gear assembly having driving connection with said drive member, one of said elements of said planetary gear assembly having driving connection with said driven member, a brake element adapted for braking one of said elements of said planetary gear assembly to said housing, means for effecting engagement of said brake element upon rotation of said drive member in one direction relative to said driven member and for effecting disengagement of said brake element upon rotation of said drive member in the other direction relative to said driven member, a clutch element adapted for clutching two of said elements of said planetary gear assembly together, means for effecting engagement of said clutch element upon rotation of said drive member in one direction relative to said driven member and for effecting engagement of said clutch member upon rotation of said drive member in the other direction relative to said driven member.

11. In a transmission having a housing, a torque converter unit comprising pump and turbine elements, a first clutch element for clutching said pump and turbine elements together, a second clutch element for clutching said pump and turbine elements together, means for effecting engagement of said second clutch element when said turbine element tends to overrun said pump element and for effecting disengagement of said second clutch element when said pump element tends to overrun said turbine element, means for preventing engagement of said first clutch element when said second clutch element is disengaged and for preventing disengagement of said second clutch element when said first clutch element is engaged, a drive member driven from said turbine element, a driven member, a planetary gear assembly comprising three elements, namely, a sun gear, planet pinion means and a planet cage, one of said elements of said planetary gear assembly having driving connection with said drive member, one of said elements of said planetary gear assembly having driving connection with said driven member, a first brake element adapted for braking one of said elements of said planetary gear assembly to said housing, a second brake element adapted for braking said one element of said planetary gear assembly to said housing, means for effecting engagement of said second brake element upon rotation of said drive member in one direction relative to said driven member and for effecting disengagement of said second brake element upon rotation of said drive member in the other direction relative to said driven member, means for preventing engagement of said first brake element when said second brake element is disengaged and for preventing disengagement of said second brake element when said first brake element is engaged, a third clutch element adapted for clutching two of said elements of said planetary gear assembly together, a fourth clutch element adapted for clutching said two elements of said planetary gear assembly together, means for effecting engagement of said fourth clutch element upon rotation of said drive member in one direction relative to said driven member and for effecting disengagement of said fourth clutch element upon rotation of said drive member in the other direction relative to said driven member, and means for preventing engagement of said third clutch element when said fourth clutch element is disengaged and for preventing disengagement of said fourth clutch element when said third clutch element is engaged.

12. In a transmission having a housing, a torque converter unit comprising pump and turbine elements, a first clutch element for clutching said pump and turbine elements together, a second clutch element for clutching said pump and turbine elements together, means for effecting engagement of said second clutch element when said turbine element tends to overrun said pump element and for effecting disengagement of said second clutch element when said pump element tends to overrun said turbine element, means for preventing engagement of said first clutch element when said second clutch element is disengaged and for preventing disengagement of said second clutch element when said first clutch element is engaged, a drive member driven from said turbine element, a sun gear fixed to said drive member, a planet carrier disposed about said drive member, compound planet pinions carried by said planet carrier and having meshing engagement with said sun gear, a driven member, a gear on said driven member having meshing engagement with said compound planet pinions, a planet cage arranged concentrically about said planet pinions and having meshing engagement therewith, a clutch means for selectively clutching either said planet cage or said gear on said driven member to the latter, an annular hub member non-rotatably mounted on said planet carrier and axially movable therealong, a first brake element at one end of said hub member adapted for braking said planet carrier to said housing for preventing rotation of said planet carrier in one direction, a second brake element non-rotatably mounted relative to said first brake element and axially movable therealong, said second brake element being adapted to brake said planet carrier to said housing, for preventing rotation of said planet carrier in the other direction, external helical threads formed on said second brake element, an axially fixed annular spring carrier having internal helical threads cooperating with the external helical threads on said second brake element, a coil spring friction brake carried on the outer periphery of said spring carrier, said coil spring friction brake being operable upon rotation of said planet carrier in one direction relative to said housing to brake said spring carrier to said housing for causing said second brake element to be threaded axially whereby the latter is engaged, said second brake element being disengaged upon rotation of said planet carrier in the other direction relative to said housing, means for preventing engagement of said first brake element when said second brake element is disengaged and for preventing disengagement of said second brake element when said first brake element is engaged, a first clutch element at the other end of said hub member adapted for clutching said planet carrier to said planet cage in one direction of rotation of said planet carrier relative to said planet cage, a second clutch element non-rotatably mounted relative to said first clutch element and axially movable therealong for clutching said planet carrier to said planet cage in the other direction of rotation of said planet carrier relative to said planet cage, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said planet carrier in one direction relative to said planet cage to clutch said spring carrier to said planet cage causing said second clutch element to be threaded axially whereby said second clutch element is engaged, said second clutch element being disengaged upon rotation of said planet carrier in the other direction relative to said planet cage, and means for preventing engagement of said first clutch element when said second clutch element is disengaged and for preventing disengagement of said second clutch element when said first clutch element is engaged.

13. In a transmission having a housing, a drive member, a driven member, a planetary gear assembly comprising three elements namely, a sun gear, a planet carrier, and planet pinion means, one of said elements of said planetary gear assembly having driving connection with said drive member, the other of said elements of said planetary gear assembly having driving connection with said driven member, a first axially movable brake element adapted for braking one of said elements of said planetary gear assembly to said housing, a second axially movable brake element adapted for braking said one element of said planetary gear assembly to said housing, means for effecting engagement of said second brake element upon rotation of said drive member in one direction relative to said driven member and for effecting disengagement of said second brake element upon rotation of said drive member in the other direction relative to said driven member, means for preventing engagement of said first brake element when said second brake element is disengaged and for preventing disengagement of said second brake element when said first brake element is engaged, a first axially movable clutch element adapted for clutching one of said elements of said planetary gear assembly to said drive member, a second axially movable clutch element adapted for clutching said one element of said planetary gear assembly to said drive member, means for effecting engagement of said second clutch element upon rotation of said drive member in one direction relative to said driven member and for effecting disengagement of said second clutch element upon rotation of said drive member in the other direction relative to said driven member, and means for preventing engagement of said first clutch element when said second clutch element is disengaged and for preventing disengagement of said second clutch element when said first clutch element is engaged.

14. In a transmission having a housing, a drive member, a sun gear fixed to said drive member, a planet carrier disposed about said drive member, compound planet pinions carried by said planet carrier and having meshing engagement with said sun gear, a driven member, a gear on said driven member having meshing engagement with said compound planet pinions, an annular hub member non-rotatably mounted on said planet carrier and axially movable therealong, a first brake element at one end of said hub member adapted for braking said planet carrier to said housing for preventing rotation of said planet carrier in one direction, a second brake element non-rotatably mounted relative to said first brake element and axially movable therealong, said second brake element being adapted to brake said planet carrier to said housing for preventing rotation of said planet carrier in the other direction, external helical threads formed on said second brake element, an axially fixed annular spring carrier having internal helical threads cooperating with the external helical threads on said second brake element, a coil spring friction brake carried on the outer periphery of said spring carrier, said coil spring friction brake being operable upon rotation of said planet carrier in one direction relative to said housing to brake said spring carrier to said housing for causing said second brake element to be threaded axially whereby the latter is engaged, said second brake element being disengaged upon rotation of said planet carrier in the other direction relative to said housing, means for preventing engagement of said first brake element when said second brake element is disengaged and for preventing disengagement of said second brake element when said first brake element is engaged, a first clutch element at the other end of said hub member adapted for clutching said planet carrier to said drive member in one direction of rotation of said drive member relative to said planet carrier, a second clutch element non-rotatably mounted relative to said first clutch element and axially movable therealong for clutching said planet carrier to said drive member in the other direction of rotation of said drive member relative to said planet carrier, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said planet carrier to clutch said spring carrier to said drive member causing said second clutch element to be threaded axially whereby said second clutch element is engaged, said second clutch element being disengaged upon rotation of said drive member in the other direction relative to said planet carrier, and means for preventing engagement of said first clutch element when said second clutch element is disengaged and for preventing disengagement of said second clutch element when said first clutch element is engaged.

15. In a transmission having a housing, a torque converter unit comprising pump and turbine elements, a first clutch element for clutching said pump and turbine elements together when said turbine element tends to overrun said pump element and for effecting disengagement of said first clutch element when said pump element tends to overrun said turbine element, a drive member driven from said turbine element, a driven element, a planetary gear assembly comprising three elements, namely, a sun gear, a planet carrier, and planet pinion means, one of said elements of said planetary gear assembly having driving connection with said drive member, one of said elements of said planetary gear assembly having driving connection with said driven member, a brake element adapted for braking one of said elements of said planetary gear assembly to said housing, means for effecting engagement of said brake element upon rotation of said drive member in one direction relative to said driven member and for effecting disengagement of said brake element upon rotation of said drive member in the other direction relative to said driven member, a second clutch element adapted for clutching one of said elements of said planetary gear assembly to said drive member, means for effecting engagement of said second clutch element upon rotation of said drive member in one direction relative to said driven member and for effecting disengagement of said second clutch element upon rotation of said drive member in the other direction of rotation relative to said driven member.

16. In a transmission having a housing, a torque converter unit comprising pump and turbine elements, a first clutch element for clutching said pump and turbine elements together, means for effecting engagement of said first clutch element upon rotation of said pump element in one direction relative to said turbine element and for effecting disengagement of said first clutch element upon rotation of said pump element in the other direction of rotation relative to said turbine element, a drive shaft driven from said turbine element, a driven member, a planetary gear assembly comprising three elements, namely, a sun gear, a planet carrier, and planet pinion means, one of said elements of said planetary gear assembly having driving connection with said drive member, one of said elements of said planetary gear assembly having connection with said driven member, a first brake element adapted for braking one of said elements of said planetary gear assembly to said housing, a second brake element adapted for braking said one element of said planetary gear assembly to said housing, means for effecting engagement of said second brake element upon rotation of said drive member in one direction relative to said driven member and for effecting disengagement of said second brake element upon rotation of said drive member in the other direction relative to said driven member, means for preventing engagement of said first brake element when said second brake element is disengaged and for preventing disengagement of said second brake element when said first brake element is engaged, a second clutch element adapted for clutching one of said elements of said planetary gear assembly to said drive member, a third clutch element adapted for clutching said one element of said planetary gear assembly to said drive member, means for effecting engagement of said third clutch element upon rotation of said drive member in one direction relative to said driven member and for effecting disengagement of said third clutch element upon rotation of said drive member in the other direction relative to said driven member, and means for preventing engagement of said third clutch element when said second clutch element is disengaged and for preventing disengagement of said third clutch element when said second clutch element is engaged.

17. In a transmission having a housing, a torque converter unit comprising pump and turbine elements, a first clutch element for clutching said pump and turbine elements together, a second clutch element for clutching said pump and turbine elements together, means for effecting engagement of said second clutch element upon rotation of said pump element in one direction relative to said turbine element and for effecting disengagement of said second clutch element upon rotation of said pump element in the other direction relative to said turbine element, means for preventing engagement of said first clutch element when said second clutch element is disengaged and for preventing disengagement of said second clutch element when said first clutch element is engaged, a drive member driven from said turbine element, a driven member, a planetary gear assembly comprising three elements, namely, a sun gear, a planet carrier and planet pinion means, one of said elements of said planetary gear assembly having driving connection with said drive member, one of said elements of said planetary gear assembly having driving connection with said driven member, a first brake element adapted for braking one of said elements of said planetary gear assembly to said housing, a second brake element adapted for braking said one element of said planetary gear assembly to said housing, means for effecting engagement of said second brake element upon rotation of said drive member in one direction relative to said driven member and for effecting disengagement of said second brake element upon rotation of said drive member in the other direction relative to said driven member, means for preventing engagement of said first brake element when said second brake element is disengaged and for preventing disengagement of said second brake element when said first brake element is engaged, a third clutch element adapted for clutching one of said elements of said planetary gear assembly to said drive member, a fourth clutch element adapted for clutching said one element of said planetary gear assembly to said drive member, means for effecting engagement of said fourth clutch element upon rotatiton of said drive member in one direction relative to said driven member and for effecting disengagement of said fourth clutch element upon rotation of said drive member in the other direction relative to said driven member, and means for preventing engagement of said third clutch element when said fourth clutch element is disengaged and for preventing disengagement of said fourth clutch element when said third clutch element is engaged.

18. In a transmission having a housing, a torque converter unit comprising pump and turbine elements, a first clutch element for clutching said pump and turbine elements together, means for effecting engagement of said first clutch element upon rotation of said pump element in one direction relative to said turbine element and for effecting disengagement of said first clutch element upon rotation of said pump element in the other direction relative to said turbine element, a drive member driven from said turbine element, an intermediate member, a first planetary gear assembly comprising three elements, namely, a sun gear, a planet carrier and planet pinion means, one of said elements of said first planetary gear assembly having connection with said drive member, one of said elements of said first planetary gear assembly having connection with said intermediate member, a first brake element adapted for braking one of said elements of said first planetary gear assembly to said housing, means for effecting engagement of said first brake element upon rotation of said drive member in one direction relative to said intermediate member and for effecting disengagement of said first brake element upon rotation of said drive member in the other direction relative to said intermediate member, a second clutch element adapted for clutching one of said elements of said first planetary gear assembly to said drive member, means for effecting engagement of said second clutch element upon rotation of said drive member in one direction relative to said intermediate member and for effecting disengagement of said second clutch element upon rotation of said drive member in the other direction of rotation relative to said intermediate member, a driven member, a second planetary gear assembly comprising three elements, namely, a sun gear, planet pinion means and a planet cage, one of said elements of said second planetary gear assembly having connection with said intermediate member, one of said elements of said second planetary gear assembly having connection with said driven member, a second brake element adapted for braking one of said elements of said second planetary gear assembly to said housing, means for effecting engagement of said second brake element upon rotation of said intermediate member in one direction relative to said driven member and for effecting disengagement of said second brake element upon rotation of said intermediate member in the other direction of rotation relative to said driven member, a third clutch element adapted for clutching the said two elements of said second planetary gear assembly together, means for effecting engagement of said third clutch element upon rotation of said intermediate member in one direction of rotation relative to said driven member and for effecting disengagement of said third clutch element upon rotation of said intermediate member in the other direction of rotation relative to said driven member.

19. In a transmission having a housing, a torque converter unit comprising pump and turbine elements, a first clutch element for clutching said pump and turbine elements together, a second clutch element for clutching said pump and turbine elements together, means for effecting engagement of said second clutch element upon rotation of said pump element in one direction relative to said turbine element and for effecting disengagement of said second clutch element upon rotation of said pump element in the other direction relative to said turbine element, means for preventing engagement of said first clutch element when said second clutch element is disengaged and for preventing disengagement of said second clutch element when said first clutch element is engaged, a drive member driven from said turbine element, an intermediate member, a first planetary gear assembly comprising three elements, namely, a sun gear, a planet carrier and planet pinion means, one of said elements of said first planetary gear assembly having driving connection with said drive member, the other of said elements of said first planetary gear assembly having connection with said intermediate member, a first brake element adapted for braking one of said elements of said first planetary gear assembly to said housing, a second brake element adapted for braking said one element of said first planetary gear assembly to said housing, means for effecting engagement of said second brake element upon rotation of said drive member in one direction relative to said intermediate member and for effecting disengagement of said second brake element upon rotation of said drive member in the other direction of rotation relative to said intermediate member, means for preventing engagement of said first brake element when said second brake element is disengaged and for preventing disengagement of said second brake element when said first brake element is engaged, a third clutch element adapted for clutching one of said elements of said first planetary gear assembly to said drive member, a fourth clutch element adapted for clutching said one element of said first planetary gear assembly to said drive member, means for effecting engagement of said fourth clutch element upon rotation of said drive member in one direction relative to said intermediate member and for effecting disengagement of said fourth clutch element upon rotation of said drive member in the other direction relative to said intermediate member, means for preventing engagement of said third clutch element when said fourth clutch element is disengaged and for preventing disengagement of said fourth clutch element when said third clutch element is engaged, a driven member, a second planetary gear assembly comprising three elements, namely, a sun gear, planet pinion means, and a planet cage, one of said elements of said second planetary gear assembly having connection with said intermediate member, one of said elements of said second planetary gear assembly having connection with said driven member, a third brake element adapted for braking one of said elements of said second planetary gear assembly to said housing, a fourth brake element adapted for braking said one of said elements of said second planetary gear assembly to said housing, means for effecting engagement of said fourth brake element upon rotation of said intermediate member in one direction relative to said driven member and for effecting disengagement of said fourth brake element upon rotation of said intermediate member in the other direction relative to said driven member, means for preventing engagement of said third brake element when said fourth brake element is disengaged and for preventing disengagement of said fourth brake element when said third brake element is engaged, a fifth clutch element adapted for clutching two of said elements of said second planetary gear assembly together, a sixth clutch element adapted for clutching the said two elements of said second planetary gear assembly together, means for effecting engagement of said sixth clutch element upon rotation of said intermediate member in one direction relative to said driven member and for effecting disengagement of said sixth clutch element upon rotation of said intermediate member in the other direction relative to said driven member, and means for preventing engagement of said fifth clutch element when said sixth clutch element is disengaged and for preventing disengagement of said sixth clutch element when said fifth clutch element is engaged.

20. In a transmission having a housing, a torque converter unit comprising pump and turbine elements, a first clutch element for clutching said pump and turbine elements together in one direction of rotation of said pump element relative to said turbine element, a second clutch element for clutching said pump and turbine elements together in the other direction of rotation of said pump element relative to said turbine element, means for effecting engagement of said second clutch element upon rotation of said pump element in one direction relative to said turbine element and for effecting disengagement of said second clutch element upon rotation of said pump element in the other direction relative to said turbine element, means for preventing engagement of said first clutch element when said second clutch element is disengaged and for preventing disengagement of said second clutch element when said first clutch element is engaged, a drive member driven from said turbine element, a sun gear fixed to said drive member, a first planet carrier disposed about said drive member, compound planet pinions carried by said first planet carrier and having meshing engagement with said sun gear, an intermediate member, a gear on said intermediate member having meshing engagement with said compound planet pinions, a first annular hub member nonrotatably mounted on said first planet carrier and axially movable therealong, a first brake element at one end of said first hub member adapted for braking said first planet carrier to said housing for preventing rotation of said first planet carrier in one direction, a second brake element nonrotatably mounted relative to said first brake element and axially movable therealong, said second brake element being adapted to brake said first planet carrier to said housing for preventing rotation of said first planet carrier in the other direction, external helical threads formed on said second brake element, an axially fixed annular spring carrier having internal helical threads cooperating with the external helical threads on said second brake element, a coil spring friction brake carried on the outer periphery of said spring carrier, said coil spring friction brake being operable upon rotation of said first planet carrier in one direction relative to said housing to brake said spring carrier to said housing for causing said second brake element to be threaded axially whereby the latter is engaged, said second brake element being disengaged upon rotation of said first planet carrier in the other direction relative to said housing, means for preventing engagement of said first brake element when said second brake element is disengaged and for preventing disengagement of said second brake element when said first brake element is engaged, a third clutch element at the other end of said first hub member adapted for clutching said first planet carrier to said drive member in one direction of rotation of said drive member relative to said first planet carrier, a fourth clutch element nonrotatably mounted relative to said third clutch element and axially movable therealong for clutching said first planet carrier to said drive member in the other direction of rotation of said drive member relative to said first planet carrier, external helical threads formed on said fourth clutch element, an axially fixed annular spring carrier having internal helical threads cooperating with said external helical threads on said fourth clutch element, a coil spring friction clutch carried on the outer periphery of said spring carrier, said coil spring friction clutch being operable upon rotation of said drive member in one direction relative to said first planet carrier to clutch said spring carrier to said drive member causing said fourth clutch element to be threaded axially whereby said fourth clutch element is engaged, said fourth clutch element being disengaged upon rotation of said drive member in the other direction relative to said first planet carrier, means for preventing engagement of said third clutch element when said fourth clutch element is disengaged and for preventing disengagement of said fourth clutch element when said third clutch element is engaged, a sun gear fixed to said intermediate member, a second planet carrier disposed about said intermediate member, compound planet pinions carried by said second planet carrier and having meshing engagement with said sun gear, a driven member, a gear on said driven member having meshing engagement with said compound planet pinions, a planet cage arranged concentrically about said planet pinions and having meshing engagement therewith, clutch means for selectively clutching either said planet cage or said gear on said driven member to the latter, a second annular hub member nonrotatably mounted on said second planet carrier and axially movable therealong, a third brake element at one end of said second hub member adapted for braking said second planet carrier to said housing for preventing rotation of said second planet carrier in one direction, a fourth brake element nonrotatably mounted relative to said third brake element and axially movable therealong, said fourth brake element being adapted to brake said second planet carrier to said housing for preventing rotation of said second planet carrier in the other direction, external helical threads formed on said fourth brake element, an axially fixed annular spring carrier having internal helical threads cooperating with the external helical threads on said fourth brake element, a coil spring friction brake carried on the outer periphery of said spring carrier, said coil spring friction brake being operable upon rotation of said second planet carrier in one direction relative to said housing to brake said spring carrier to said housing for causing said fourth brake element to be threaded axially whereby the latter is engaged, said fourth brake element being disengaged upon rotation of said second planet carrier in the other direction relative to said housing, means for preventing engagement of said third brake element when said fourth brake element is disengaged and for preventing disengagement of said fourth brake element when said third brake element is engaged, a fifth clutch element at the other end of said second hub member adapted for clutching said second planet carrier to said planet cage in one direction of rotation of said second planet carrier relative to said planet cage, a sixth clutch element nonrotatably mounted relative to said fifth clutch element and axially movable therealong for clutching said second planet carrier to said planet cage in the other direction of rotation of said second planet carrier relative to said planet cage, external helical threads formed on said sixth clutch element, an axially fixed annular spring carrier having internal helical threads cooperating with said external helical threads on said sixth clutch element, a coil spring friction clutch carried on the outer periphery of said spring carrier, said coil spring friction clutch being operable upon rotation of said second planet carrier in one direction relative to said planet cage to clutch said spring carrier to said planet cage causing said sixth clutch element to be threaded axially whereby said sixth clutch element is engaged, said sixth clutch element being disengaged upon rotation of said second planet carrier in the other direction relative to said planet cage, and means for preventing engagement of said fifth clutch element when said sixth clutch element is disengaged and for preventing disengagement of said sixth clutch element when said fifth clutch element is engaged.

21. In a transmission having a housing, a torque converter unit comprising pump and turbine elements, a first clutch element nonrotatably mounted relative to said turbine element and axially movable therealong for clutching said pump and turbine elements together in one direction of rotation of said pump element relative to said turbine element, a second clutch element nonrotatably mounted relative to said first clutch element and axially movable therealong for clutching said pump and turbine elements together in the other direction of rotation of said pump element relative to said driven element, external helical threads formed on said second clutch element, an axially fixed annular spring carrier having internal helical threads cooperating with the external helical threads on said second clutch element, a coil spring friction clutch carried on the outer periphery of said spring carrier, said coil spring friction clutch being operable upon rotation of said pump element in one direction relative to said turbine element to clutch said spring carrier to said pump element causing said second clutch element to be threaded axially whereby the latter is engaged, said second clutch element being disengaged upon rotation of said pump element in the other direction relative to said turbine element, means for preventing engagement of said first clutch element when said second clutch element is disengaged and for preventing disengagement of said second clutch element when said first clutch element is engaged, said means comprising an annular shoulder formed integrally with said first clutch element, a rearwardly extending drive shaft driven from said turbine element, an output shaft aligned coaxially of said drive shaft, a first sleeve member disposed concentrically about said output shaft and driven from said drive shaft, a sun gear fixed to said first sleeve member, a second sleeve member disposed concentrically about said first sleeve member and having a planet carrier at one end thereof, compound planet pinions carried by said planet carrier and having meshing engagement with said compound planet pinions, a planet cage arranged concentrically about said planet pinions and having meshing engagement therewith, an axially shiftable clutch collar member mounted on said output shaft for selectively clutching either said planet cage or said gear on said output shaft to the latter, brake means for braking said planet cage when said clutch collar member is shifted, an annular hub member nonrotatably mounted on said second sleeve member and axially movable therealong, a first brake element at one end of said hub member adapted for braking said planet carrier to said housing for preventing rotation of said planet carrier in one direction, a second brake element nonrotatably mounted relative to said first brake element and axially movable therealong, said second brake element being adapted to brake said planet carrier to said housing for preventing rotation of said planet carrier in the other direction, external helical threads formed on said second brake element, an axially fixed annular spring carrier having internal helical threads cooperating with the external helical threads on said second brake element, a coil spring friction brake carried on the outer periphery of said spring carrier, said coil spring friction brake being operable upon rotation of said planet carrier in one direction relative to said housing to brake said spring carrier to said housing for causing said second brake element to be threaded axially whereby the latter is engaged, said second brake element being disengaged upon rotation of said planet carrier in the other direction relative to said housing, means for preventing engagement of said first brake element when said second brake element is disengaged and for preventing disengagement of said second brake element when said first brake element is engaged, said means comprising a first annular shoulder formed integrally with said hub member, a third clutch element at the other end of said hub member adapted for clutching said planet carrier to said planet cage in one direction of rotation of said planet carrier relative to said planet cage, a fourth clutch element nonrotatably mounted relative to said third clutch element and axially movable therealong for clutching said planet carrier to said planet cage in the other direction of rotation of said planet carrier relative to said planet cage, external helical threads formed on said fourth clutch element, an axially fixed annular spring carrier having internal helical threads cooperating with said external helical threads on said fourth clutch element, a coil spring friction clutch carried on the outer periphery of said spring carrier, said coil spring friction clutch being operable upon rotation of said planet carrier in one direction relative to said planet cage to clutch said spring carrier to said planet cage causing said fourth clutch element to be threaded axially whereby said fourth clutch element is engaged, said fourth clutch element being disengaged upon rotation of said planet carrier in the other direction relative to said planet cage, means for preventing engagement of said third clutch element when said fourth clutch element is disengaged and for preventing disengagement of said fourth clutch element when said third clutch element is engaged, and said last named means comprising a second annular shoulder formed integrally with said hub member.

22. In a transmission having a housing, a torque converter unit comprising pump and turbine elements, a first clutch element nonrotatably mounted on said turbine element and axially movable therealong for clutching said pump and turbine elements together in one direction of rotation of said pump element relative to said turbine element, a second clutch element nonrotatably mounted on said first clutch element and axially movable therealong for clutching said pump and turbine elements together in the other direction of rotation of said pump element relative to said turbine element, external helical threads formed on said second clutch element, first axially fixed annular spring carrier having internal helical threads cooperating with said external helical threads on said second clutch element, a coil spring friction clutch carried on the outer periphery of said spring carrier, said coil spring friction clutch being operable upon rotation of said pump element in one direction relative to said turbine element to clutch said first spring carrier to said pump element causing said second clutch element to be threaded axially whereby said second clutch element is engaged, said second clutch element being disengaged upon rotation of said pump element in the other direction relative to said turbine element, means for preventing engagement of said first clutch element when said second clutch element is disengaged and for preventing disengagement of said second clutch element when said first clutch element is engaged, said last named means comprising an annular shoulder formed integrally with said first clutch element, a rearwardly extending drive shaft driven from said turbine element, an intermediate shaft aligned coaxially of said drive shaft, an output shaft aligned coaxially of said intermediate shaft, a first sleeve member mounted concentrically about said intermediate shaft and driven from said drive shaft, a sun gear fixed to said first sleeve member, a second sleeve member disposed concentrically about said first sleeve member and having a first planet carrier at one end thereof, compound planet pinions carried by said planet carrier and having meshing engagement with said sun gear, a gear on said intermediate shaft having meshing engagement with said compound planet pinions, a first annular hub member nonrotatably mounted on said second sleeve member and axially movable therealong, a first brake element at one end of said first hub member adapted for braking said first planet carrier to said housing for preventing rotation of said first planet carrier in one direction, a second brake element nonrotatably mounted relative to said first brake element and axially movable therealong, said second brake element being adapted to brake said first planet carrier to said housing for preventing rotation of said first planet carrier in the other direction, external helical threads formed on said second brake element, a second axially fixed annular spring carrier having internal helical threads cooperating with the external helical threads on said second brake element, a coil spring friction brake carried on the outer periphery of said second spring carrier, said coil spring friction brake being operable upon rotation of said first planet carrier in one direction relative to said housing to brake said second spring carrier to said housing for causing said second brake element to be threaded axially whereby the latter is engaged, said second brake element being disengaged upon rotation of said planet carrier in the other direction relative to said housing, means for preventing engagement of said first brake element when said second brake element is disengaged and for preventing disengagement of said second brake element when said first brake element is engaged, said last named means comprising a first annular shoulder formed integrally with said first hub member, a third clutch element at the other end of said first hub member adapted for clutching said first planet carrier to said drive shaft in one direction of rotation of said first planet carrier relative to said drive shaft, a fourth clutch element nonrotatably mounted relative to said third clutch element and axially movable therealong for clutching said first planet carrier to said drive shaft in the other direction of rotation of said first planet carrier relative to said drive shaft, external helical threads formed on said fourth clutch element, a third axially fixed annular spring carrier having internal helical threads cooperating with said external helical threads on said fourth clutch element, a coil spring friction clutch carried on the outer periphery of said third spring carrier, said coil spring friction clutch being operable upon rotation of said drive shaft in one direction relative to said first planet carrier to clutch said third spring carrier to said drive shaft causing said fourth clutch element to be threaded axially whereby said fourth clutch element is engaged, said fourth clutch element being disengaged upon rotation of said drive shaft in the other direction relative to said first planet carrier, means for preventing engagement of said third clutch element when said fourth clutch element is disengaged and for preventing disengagement of said fourth clutch element when said third clutch element is engaged, said last named means comprising a second annular shoulder formed integrally with said first hub member, a third sleeve member mounted concentrically about said output shaft and driven from said intermediate shaft, a sun gear fixed to said third sleeve member, a fourth sleeve member disposed about said third sleeve member and having a second planet carrier at one end thereof, compound planet pinions carried by said second planet carrier and having meshing engagement with said sun gear on said third sleeve member, a gear on said output shaft having meshing engagement with said compound planet pinions, a planet cage arranged concentrically about said planet pinions and having meshing engagement therewith, an axially shiftable jaw clutch member mounted on said output shaft for selectively clutching either said planet cage or said gear on said output shaft to the latter, brake means arranged about said planet cage for braking the latter when said clutch collar member is shifted axially, a second annular hub member nonrotatably mounted on said fourth sleeve member and axially movable therealong, a third brake element at one end of said second hub member adapted for braking said second planet carrier to said housing for preventing rotation of said second planet carrier in one direction, a fourth brake element nonrotatably mounted relative to said third brake element and axially movable therealong, said fourth brake element being adapted to brake said second planet carrier to said housing for preventing rotation of said second planet carrier in the other direction, external helical threads formed on said fourth brake element, a fourth axially fixed annular spring carrier having internal helical threads cooperating with the external helical threads on said fourth brake element, a coil spring friction brake carried on the outer periphery of said fourth spring carrier, said coil spring friction brake being operable upon rotation of said second planet carrier in one direction relative to said housing to brake said fourth spring carrier to said housing for causing said fourth brake element to be threaded axially whereby the latter is engaged, said fourth brake element being disengaged upon rotation of said second planet carrier in the other direction relative to said housing, means for preventing engagement of said third brake element when said fourth brake element is disengaged and for preventing disengagement of said fourth brake element when said third brake element is engaged, said last named means comprising a first annular shoulder formed integrally with said second hub member, a fifth clutch element at the other end of said second hub member adapted for clutching said second planet carrier to said planet cage in one direction of rotation of said second planet carrier relative to said planet cage, a sixth clutch element nonrotatably mounted relative to said fifth clutch element and axially movable therealong for clutching said second planet carrier to said planet cage in the other direction of rotation of said second planet carrier relative to said planet cage, external helical threads formed on said sixth clutch element, a fifth axially fixed annular spring carrier having internal helical threads cooperating with said external helical threads on said sixth clutch element, a coil spring friction clutch carried on the outer periphery of said fifth spring carrier, said coil spring friction clutch being operable upon rotation of said second planet carrier in one direction relative to said planet cage to clutch said fifth spring carrier to said planet cage causing said sixth clutch element to be threaded axially whereby said sixth clutch element is engaged, said sixth clutch element being disengaged upon rotation of said second planet carrier in the other direction relative to said planet cage, means for preventing engagement of said fifth clutch element when said sixth clutch element is disengaged and for preventing disengagement of said sixth clutch element when said fifth clutch element is engaged, and said last named means comprising a second annular shoulder formed integrally with said second hub member.

23. In a transmission, the combination of a first member, a second member, a third member, a first axially movable torque transmitting element for connecting said third member to said first member, a second axially movable torque transmitting element for connecting said third member to said first member, means for disposing said second torque transmitting element into an operative position upon rotation of said second member in one direction relative to said third member and for rendering said second torque transmitting element inoperative upon rotation of said second member in the other direction relative to said third member, selectively operable means for disposing said first torque transmitting element into operative position substantially simultaneously at the same time as said second torque transmitting element is disposed in an operative position, a third axially movable torque transmitting element for connecting said third member to said second member, a fourth axially movable torque transmitting element for connecting said third member to said second member, means for disposing said fourth torque transmitting element into an operative position upon rotation of said second member in one direction relative to said third member and for rendering said fourth torque transmitting element inoperative upon rotation of said second member in the opposite direction relative to said third member, and selectively operable means for disposing said third torque transmitting element into an operative position substantially at the same time as said fourth torque transmitting element is disposed in an operative position.

24. In a transmission, the combination of a first member, a second member, a third member, a hub member non-rotatably mounted on said third member and axially movable therealong, a first torque transmitting element at one end of said hub for connecting said third member to said first member, a second torque transmitting element non-rotatably mounted on said first torque transmitting element and axially movable therealong, external helical threads formed on said second torque transmitting element, a first axially fixed annular spring carrier having internal helical threads cooperating with the external helical threads on said second torque transmitting element, a first coil spring friction member carried on the outer periphery of said first spring carrier, said first coil spring friction member being operable upon rotation of said third member in one direction relative to said first member to connect said first spring carrier to said first member for causing said second torque transmitting element to be threaded axially whereby the latter is disposed in an operative position, said second torque transmitting element being disengaged from an operative position upon rotation of said third member in the other direction relative to said first member, selectively operable means for disposing said first torque transmitting element in an operative position substantially at the same time as said second torque transmitting element is disposed in an operative position, a third torque transmitting element at the other end of said hub member for connecting said third member to said second member in one direction of rotation of said second member relative to said third member, a fourth torque transmitting element non-rotatably mounted relative to said third torque transmitting element and axially movable therealong for connecting said third member to said second member in the other direction of rotation of said second member relative to said third member, external helical threads formed on said fourth torque transmitting element, a second axially fixed annular spring carrier having internal threads cooperating with the external helical threads on said fourth torque transmitting element, a second coil spring friction member carried on the outer periphery of said second spring carrier, said second coil spring friction member being operable upon rotation of said second member in one direction relative to said third member to connect said second spring carrier to said second member causing said fourth torque transmitting element to be threaded axially whereby said fourth torque transmitting element is disposed in an operative position, said fourth torque transmitting element being disposed in an inoperative position upon rotation of said second member in the other direction relative to said third member, and selectively operable means for disposing said third torque transmitting element in an operative position substantially at the same time as said fourth torque transmitting element is disposed in an operative position.

25. The combination of claim 24 wherein said torque transmitting elements are uni-directional jaw clutch teeth.

References Cited in the file of this patent

UNITED STATES PATENTS

| | | |
|---|---|---|
| 1,869,543 | Cheswright | Aug. 2, 1932 |
| 1,972,107 | Reynolds | Sept. 4, 1934 |
| 2,200,597 | Eason | May 14, 1940 |
| 2,371,564 | Wemp | Mar. 13, 1945 |
| 2,373,234 | Duffield | Apr. 10, 1945 |
| 2,414,832 | Orr | Jan. 28, 1947 |
| 2,418,838 | Huebner | Apr. 15, 1947 |
| 2,442,840 | Carnagua | June 8, 1948 |
| 2,455,900 | Yardy et al. | Dec. 7, 1948 |
| 2,466,721 | Maurer et al. | Apr. 12, 1949 |
| 2,531,610 | Butzman | Nov. 28, 1950 |
| 2,555,702 | Railton | June 5, 1951 |
| 2,590,472 | Soper et al. | Mar. 25, 1952 |
| 2,608,885 | Lapsley | Sept. 2, 1952 |
| 2,630,025 | Lapsley | Mar. 3, 1953 |